US010292187B2

(12) United States Patent
Kawakami et al.

(10) Patent No.: US 10,292,187 B2
(45) Date of Patent: May 14, 2019

(54) WIRELESS COMMUNICATION APPARATUS, SERVER, PAYMENT APPARATUS, WIRELESS COMMUNICATION METHOD, AND PROGRAM

(71) Applicant: SONY CORPORATION, Tokyo (JP)

(72) Inventors: Daisuke Kawakami, Kanagawa (JP); Hideyuki Suzuki, Tokyo (JP); Katsutoshi Itoh, Tokyo (JP)

(73) Assignee: SONY CORPORATION, Tokyo (JP)

( * ) Notice: Subject to any disclaimer, the term of this patent is extended or adjusted under 35 U.S.C. 154(b) by 158 days.

(21) Appl. No.: 15/505,139

(22) PCT Filed: Jun. 11, 2015

(86) PCT No.: PCT/JP2015/066825
§ 371 (c)(1),
(2) Date: Feb. 20, 2017

(87) PCT Pub. No.: WO2016/031344
PCT Pub. Date: Mar. 3, 2016

(65) Prior Publication Data

US 2017/0257895 A1 Sep. 7, 2017

(30) Foreign Application Priority Data

Aug. 29, 2014 (JP) ................................ 2014-175299
Sep. 24, 2014 (JP) ................................ 2014-193411

(51) Int. Cl.
*H04W 76/10* (2018.01)
*H04M 1/00* (2006.01)
(Continued)

(52) U.S. Cl.
CPC ......... *H04W 76/10* (2018.02); *H04L 63/0492* (2013.01); *H04L 63/10* (2013.01);
(Continued)

(58) Field of Classification Search
CPC ....... H04W 76/10; H04W 8/22; H04W 12/04; H04W 12/06; H04W 12/08; H04W 48/08;
(Continued)

(56) References Cited

U.S. PATENT DOCUMENTS

2008/0107066 A1* 5/2008 Sim ...................... H04W 48/08 370/328
2011/0057771 A1* 3/2011 Lucaci ................. H04L 12/282 340/5.5
2013/0182693 A1* 7/2013 Sperling .......... H04W 52/0229 370/338

FOREIGN PATENT DOCUMENTS

JP 2006-217196 A 8/2006
JP 2009-253752 A 10/2009
(Continued)

*Primary Examiner* — Ian N Moore
*Assistant Examiner* — Latresa A McCallum
(74) *Attorney, Agent, or Firm* — Xsensus LLP

(57) ABSTRACT

[Object] To provide a wireless communication apparatus, server, payment apparatus, wireless communication method, and program that can more safely connect to the Internet. [Solution] Provided is a wireless communication apparatus including: a first wireless communication unit configured to perform pairing and wireless communication with a wireless terminal that connects to a first network and performs wireless communication; a second wireless communication unit configured to connect to a second network and perform wireless communication; and a control unit configured to control the second wireless communication unit to transmit information on pairing with the wireless terminal in order to remove limitations on communication with the second network.

21 Claims, 17 Drawing Sheets

(51) Int. Cl.

| | |
|---|---|
| ***H04M 11/00*** | (2006.01) |
| ***H04W 12/08*** | (2009.01) |
| ***H04W 84/12*** | (2009.01) |
| ***H04W 8/22*** | (2009.01) |
| ***H04W 12/04*** | (2009.01) |
| ***H04W 12/06*** | (2009.01) |
| ***H04L 29/06*** | (2006.01) |
| ***H04W 48/08*** | (2009.01) |
| *H04W 88/04* | (2009.01) |

(52) U.S. Cl.
CPC ............ *H04M 1/00* (2013.01); *H04M 11/00* (2013.01); *H04W 8/22* (2013.01); *H04W 12/04* (2013.01); *H04W 12/06* (2013.01); *H04W 12/08* (2013.01); *H04W 48/08* (2013.01); *H04W 84/12* (2013.01); *H04L 63/18* (2013.01); *H04W 88/04* (2013.01)

(58) Field of Classification Search
CPC .. H04W 84/12; H04W 88/04; H04L 63/0492; H04L 63/10; H04L 63/18; H04M 1/00; H04M 11/00
See application file for complete search history.

(56) References Cited

FOREIGN PATENT DOCUMENTS

| | | | |
|---|---|---|---|
| JP | 2010-278862 | A | 12/2010 |
| JP | 2010-288157 | A | 12/2010 |
| JP | 2014-155038 | A | 8/2014 |
| WO | 2006/062066 | A1 | 6/2006 |

* cited by examiner 1
500
510
BASE STATION
100
WLAN TERMINAL
300
340
AUTHENTICATION SERVER
400
SERVICE NETWORK
320
GATEWAY
330
SUBSCRIBER INFORMATION SERVER
350
NETWORK INFORMATION PROVIDING SERVER
310
BASE STATION
200
WWAN TERMINAL 1
500
510
400
100
SERVICE NETWORK
610
200

1
500
510
BASE STATION
100
WLAN TERMINAL
340
AUTHENTICATION SERVER
360
PAYMENT SERVER
400
SERVICE NETWORK
320
GATEWAY
610
PAYMENT TERMINAL
200
WWAN TERMINAL

340
AUTHENTICATION SERVER
510
BASE STATION
100
WLAN TERMINAL
200
WWAN TERMINAL
610
PAYMENT TERMINAL
S502
DEVICE INFORMATION
S504
ESTABLISH PAIRING
S506
PAYMENT REQUEST
PAIRING INFORMATION
508
PAYMENT PROCESS
PAIRING INFORMATION
S510
S512
POLICY
S514
EAP AUTHENTICATION PROCESS
S516
IP ADDRESS ALLOCATION
S518
PAIRING INFORMATION
S520
ACCESS RIGHT VERIFICATION PROCESS
S522
PERMIT ACCESS 900
901
PROCESSOR
902
MEMORY
903
STORAGE
904
EXTERNAL CONNECTION I/F
906
CAMERA
907
SENSOR
908
MICROPHONE
909
INPUT DEVICE
910
DISPLAY DEVICE
911
SPEAKER
913
WIRELESS COMMUNICATION I/F
914
915
917
918
BATTERY
919
AUXILIARY CONTROLLER

WIRELESS COMMUNICATION APPARATUS, SERVER, PAYMENT APPARATUS, WIRELESS COMMUNICATION METHOD, AND PROGRAM

CROSS REFERENCE TO RELATED APPLICATIONS

This application is a U.S. National Phase of International Patent Application No. PCT/JP2015/066825 filed on Jun. 11, 2015, which claims priority benefit of Japanese Patent Application No. 2014-175299 filed in the Japan Patent Office on Aug. 29, 2014 and also claims priority benefit of Japanese Patent Application No. 2014-193411 filed in the Japan Patent Office on Sep. 24, 2014. Each of the above-referenced applications is hereby incorporated herein by reference in its entirety.

TECHNICAL FIELD

The present technology relates to a wireless communication apparatus, a server, a payment apparatus, a wireless communication method, and a program.

BACKGROUND ART

Recent years have seen various services using the Internet, and means for easily accessing the Internet even away from home have been demanded. For example, terminals with a wireless wide area network (WWAN) communication function, such as smartphones and mobile phones, can access the Internet via a mobile communication network even away from home. On the other hand, terminals without a WWAN communication function are required to access the Internet using other communication schemes, such as wireless local area network (WLAN). Connecting to a network (e.g., WLAN) may require processes such as searching for an access point and inputting an identifier (ID) and a password, which leads to demands for technologies for facilitating such processes.

For example, Patent Literature 1 mentioned below discloses a technology for enabling a communication terminal, which indirectly communicates with a service providing apparatus that provides a service via another communication terminal, to seamlessly receive the service provided at the service providing apparatus.

CITATION LIST

Patent Literature

Patent Literature 1: JP 2009-253752A

DISCLOSURE OF INVENTION

Technical Problem

However, in this technical field, an additional performance improvement is desired. Hence, the present disclosure proposes a new and improved wireless communication apparatus, server, payment apparatus, wireless communication method, and program that can more safely connect to the Internet.

Solution to Problem

According to the present disclosure, there is provided a wireless communication apparatus including: a first wireless communication unit configured to perform pairing and wireless communication with a wireless terminal that connects to a first network and performs wireless communication; a second wireless communication unit configured to connect to a second network and perform wireless communication; and a control unit configured to control the second wireless communication unit to transmit information on pairing with the wireless terminal in order to remove limitations on communication with the second network.

According to the present disclosure, there is provided a wireless communication apparatus including: a first wireless communication unit configured to connect to a first network and perform wireless communication; a second wireless communication unit configured to perform pairing and wireless communication with a wireless terminal that connects to a second network and performs wireless communication; and a control unit configured to control the first wireless communication unit to transmit information on pairing with the wireless terminal in order to remove limitations on communication of the wireless terminal with the second network.

According to the present disclosure, there is provided a server including: a communication unit configured to perform communication with a first wireless terminal that connects to a first network and performs wireless communication and a second wireless terminal that connects to a second network and performs wireless communication; and a control unit configured to determine whether or not to remove limitations on communication of the second wireless terminal with the second network based on whether or not first pairing information received from the first wireless terminal by the communication unit and second pairing information received from the second wireless terminal by the communication unit coincide.

According to the present disclosure, there is provided a payment apparatus including: a first communication unit configured to perform communication with a first wireless terminal having identification information of subscribers to a first network; a second communication unit configured to perform communication with a server that determines whether or not to remove limitations on communication of a second wireless terminal with a second network; and a control unit configured to perform a payment process based on a payment request received by the first communication unit. The control unit controls the second communication unit to transmit pairing information received by the first communication unit to the server.

According to the present disclosure, there is provided a wireless communication method including: performing, by a first wireless communication unit, pairing and wireless communication with a wireless terminal that connects to a first network and performs wireless communication; connecting, by a second wireless communication unit, to a second network and performing wireless communication; and controlling the second wireless communication unit to transmit information on pairing with the wireless terminal in order to remove limitations on communication with the second network.

According to the present disclosure, there is provided a wireless communication method including: connecting, by a first wireless communication unit, to a first network and performing wireless communication; performing, by a second wireless communication unit, pairing and wireless communication with a wireless terminal that connects to a second network and performs wireless communication; and controlling the first wireless communication unit to transmit information on pairing with the wireless terminal in order to remove limitations on communication of the wireless terminal with the second network.

According to the present disclosure, there is provided a program for causing a computer to serve as: a first wireless communication unit configured to perform pairing and wireless communication with a wireless terminal that connects to a first network and performs wireless communication; a second wireless communication unit configured to connect to a second network and perform wireless communication; and a control unit configured to control the second wireless communication unit to transmit information on pairing with the wireless terminal in order to remove limitations on communication with the second network.

According to the present disclosure, there is provided a program for causing a computer to serve as: a first wireless communication unit configured to connect to a first network and perform wireless communication; a second wireless communication unit configured to perform pairing and wireless communication with a wireless terminal that connects to a second network and performs wireless communication; and a control unit configured to control the first wireless communication unit to transmit information on pairing with the wireless terminal in order to remove limitations on communication of the wireless terminal with the second network.

Advantageous Effects of Invention

As described above, according to the present disclosure, it is possible to more safely connect to the Internet.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
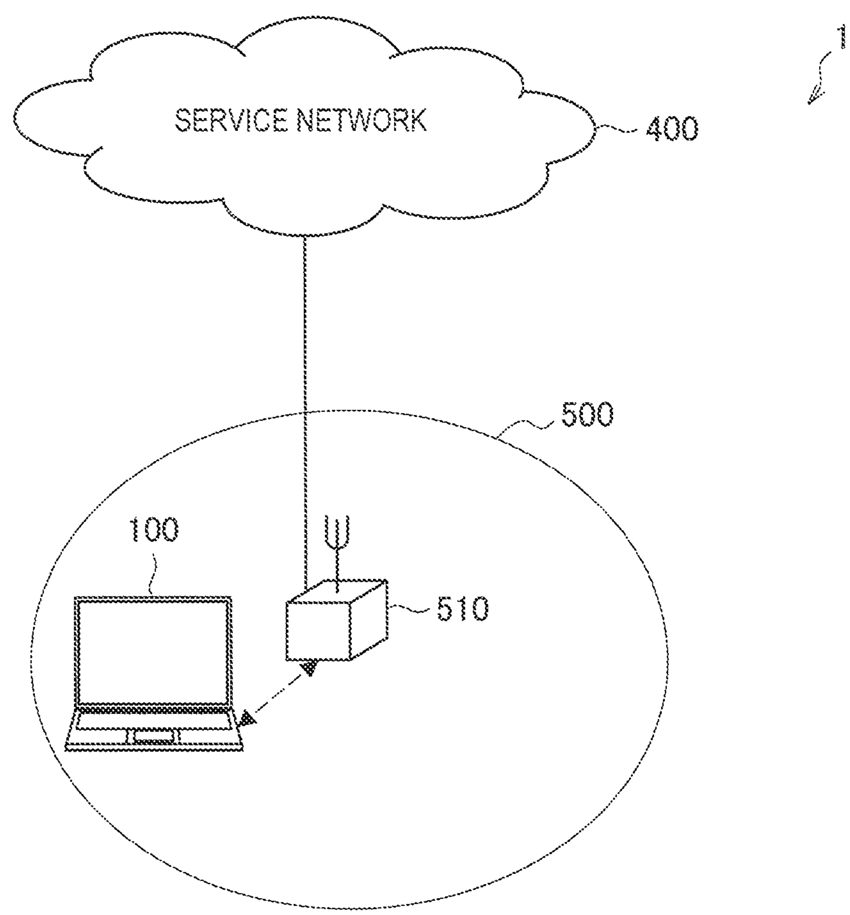
FIG. 1 is a view for explaining an overview of a wireless communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, in this specification and the appended drawings, elements having substantially the same function and structure may in some cases be distinguished by different letters appended to the same reference sign. For example, multiple elements having substantially the same function and structure are distinguished as wireless communication apparatuses 100A, 100B, and 100C as necessary. On the other hand, when it is not necessary to particularly distinguish each of multiple elements having substantially the same function and structure, only the same reference sign will be given. For example, when it is not necessary to particularly distinguish among the wireless communication apparatuses 100A, 100B, and 100C, the wireless communication apparatuses 100A, 100B, and 100C will be simply designated the wireless communication apparatus 100.

The description will proceed in the following order.

1. Overview
2. First Embodiment
    - 2-1. Configuration example of wireless communication system
    - 2-2. Configuration example of WLAN terminal
    - 2-3. Configuration example of WWAN terminal
    - 2-4. Configuration example of authentication server
    - 2-5. Operation process
3. Second Embodiment
    - 3-1. Configuration example of WLAN terminal
    - 3-2. Configuration example of WWAN terminal
    - 3-3. Configuration example of authentication server
    - 3-4. Operation process
4. Third Embodiment
    - 4-1. Overview 4-2. Configuration example of wireless communication system
4-3. Configuration example of WWAN terminal
4-4. Configuration example of payment terminal
4-5. Operation process
5. Application example
6. Conclusion

1. OVERVIEW

First, an overview of a wireless communication system 1 according to an embodiment of the present disclosure will be described with reference to FIGS. 1 and 2.

Figure 2:
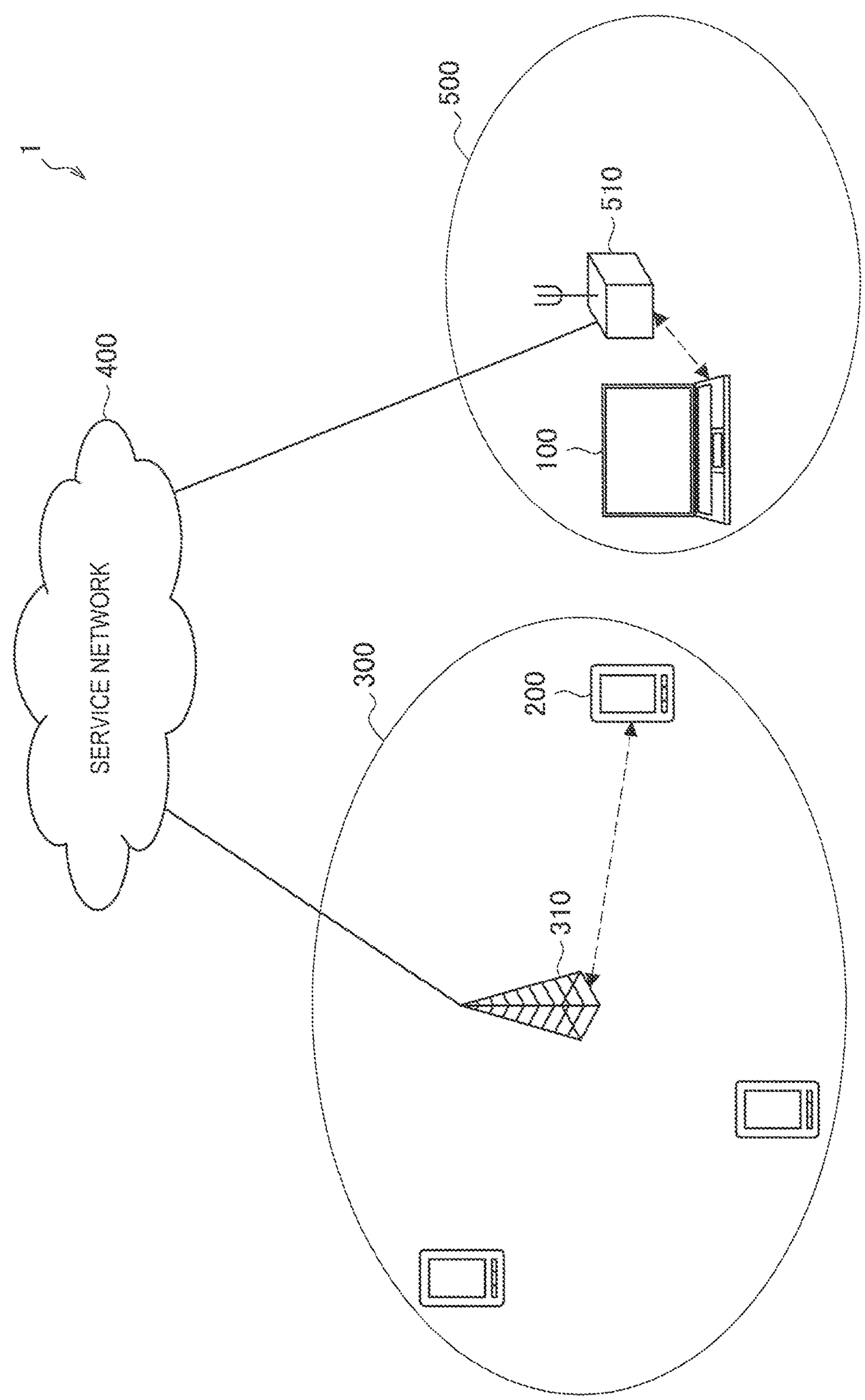
FIG. 2 is a view for explaining an overview of a wireless communication system according to an embodiment of the present disclosure.

FIG. 1 and FIG. 2 are views for explaining an overview of a wireless communication system 1 according to an embodiment of the present disclosure. In the example illustrated in FIG. 1, the wireless communication system 1 includes a wireless communication apparatus 100. In addition, in the example illustrated in FIG. 2, the wireless communication system 1 includes a wireless communication apparatus 100 and a wireless communication apparatus 200.

The wireless communication apparatus 100 is a wireless terminal capable of wirelessly communicating with another apparatus. In the example of FIG. 1, the wireless communication apparatus 100 is a notebook PC. The wireless communication apparatus 100 is a WLAN terminal that can connect to a WLAN according to a communication scheme, such as Institute of Electrical and Electronics Engineers (IEEE) 802.11a, 11b, 11g, 11n, 11ac, or 11ad. As illustrated in FIG. 1, the WLAN terminal 100 can connect to a wireless network 500 via a base station 510, and use a service provided by a service network 400. In addition, the WLAN terminal 100 can establish wireless connection with the wireless communication apparatus 200. This wireless connection can be established according to any communication scheme, such as Bluetooth (registered trademark) or near field communication (NFC). The WLAN terminal 100 can connect to a WLAN whose network information is known, such as a WLAN operated at a user's home, for example, but cannot easily connect to a WLAN whose network information is unknown, such as a WLAN away from home. Note that the wireless communication apparatus 100 may be implemented as, as well as a notebook PC, a PC, a tablet terminal, personal digital assistants (PDA), a head mounted display (HMD), a headset, a digital camera, a digital video camera, a smartphone, a mobile phone terminal, a portable music player, a portable video processor, or a portable game device.

The wireless communication apparatus 200 is a wireless terminal capable of wirelessly communicating with another apparatus. In the example of FIG. 1, the wireless communication apparatus 200 is a smartphone. The wireless communication apparatus 200 can establish wireless connection with the WLAN terminal 100, for example. In addition, the wireless communication apparatus 200 is a WWAN terminal that has a WWAN communication function and can connect to a WWAN. The WWAN terminal 200 has subscriber identification information for connection to a mobile communication network, and performs an authentication process using the subscriber identification information to establish wireless connection with a wireless network 300 (e.g., mobile communication network). The subscriber identification information is, for example, international mobile subscriber identity (IMSI) stored in a subscriber identity module card (SIM card). The WWAN terminal 200 can connect to the wireless network 300 using the WWAN communication function, and use a service provided by a service network 400. Note that the wireless communication apparatus 200 may be implemented as, as well as a smartphone, a notebook PC, a PC, a tablet terminal, PDA, a HMD, a headset, a digital camera, a digital video camera, a mobile phone terminal, a portable music player, a portable video processor, or a portable game device.

The wireless network 300 is a WWAN (first network), such as a mobile communication network. For example, the WWAN 300 is operated according to any wireless communication scheme, such as Long Term Evolution (LTE), LTE-Advanced (LTE-A), GSM (registered trademark), UMTS, W-CDMA, or CDMA2000. For example, the wireless communication apparatus 200 located within a range of a cell operated by a base station 310 connects to the WWAN 300.

The service network 400 is a public network, such as the Internet. The WWAN terminal 200 can access the service network 400 via the WWAN 300.

Here, a terminal without a WWAN communication function cannot easily access the Internet via the WWAN 300. Even in such as case, as a means of accessing the Internet away from home, for example, tethering by a terminal capable of WWAN communication may be performed, or a public WLAN may be used, for example.

Tethering is a technology in which, via a terminal with a WWAN communication function, such as a smartphone, another communication terminal connects to a WWAN 300. For example, the WWAN terminal 200 is connectable to the WWAN 300 and the WLAN terminal 100, therefore, the WWAN terminal 200 can serve as an access point that relays communication between the WWAN 300 and the WLAN terminal 100, thus enabling tethering. This allows the WLAN terminal 100 to use a service provided by the service network 400.

Tethering is available regardless of where the WWAN terminal 200 is located in a WWAN communication available area. However, terminal setting for using tethering is required to be performed in both the WWAN terminal 200 and the WLAN terminal 100, which leads to poor user convenience. Moreover, during tethering, the WWAN terminal 200 serving as an access point consumes a large amount of power.

Meanwhile, a public WLAN is a service that provides connection to the Internet using a WLAN. Hereinafter, communication using the public WLAN will be described with reference to FIG. 2. A wireless network 500 illustrated in FIG. 2 is a public network (second network) operated by a WLAN, for example. The WLAN terminal 100 can connect to the WLAN 500 to access the service network 400, or to access the service network 400 further via the WWAN 300. This allows the WLAN terminal 100 to use a service provided by the service network 400.

Here, a wireless terminal with a WWAN communication function, such as a smartphone, can connect to a surrounding public WLAN and perform user authentication using its own subscriber identification information, by using a technology of access network discovery and selection function (ANDSF) proposed by Third Generation Partnership Project (3GPP) or Wi-Fi CERTIFIED Passpoint proposed by Wi-Fi Alliance. However, a wireless terminal without a WWAN communication function, like a notebook PC, not having subscriber identification information, may require a user to select an available public WLAN for oneself and perform an authentication procedure, which leads to poor convenience.

In addition, when the WLAN terminal 100 connects to the WLAN 500, there are many cases where authentication by means of a user ID and a password provided by a communication service provider is required, and it takes time to input authentication information. When a user has a plurality of WLAN terminals 100, the operation of inputting this authentication information occurs at each terminal, and thus takes additional time. In addition, there are generally many examples in which the access right of the WLAN terminal 100 is managed by using a MAC address of a wireless LAN module, and thus there is the risk of suffering from damage from spoofing and the like.

Hence, with the above circumstance as a viewpoint, a wireless communication apparatus according to an embodiment of the present disclosure has been devised. The wireless communication apparatus according to an embodiment of the present disclosure is able to connect easily and safely to the public WLAN to use the Internet even without a WWAN communication function and subscriber identification information. Hereinafter, detailed description will be given on a wireless communication system including the wireless communication apparatus according to an embodiment of the present disclosure, with reference to FIGS. 3 to 17.

2. FIRST EMBODIMENT

[2-1. Configuration Example of Wireless Communication System]

Figure 3:
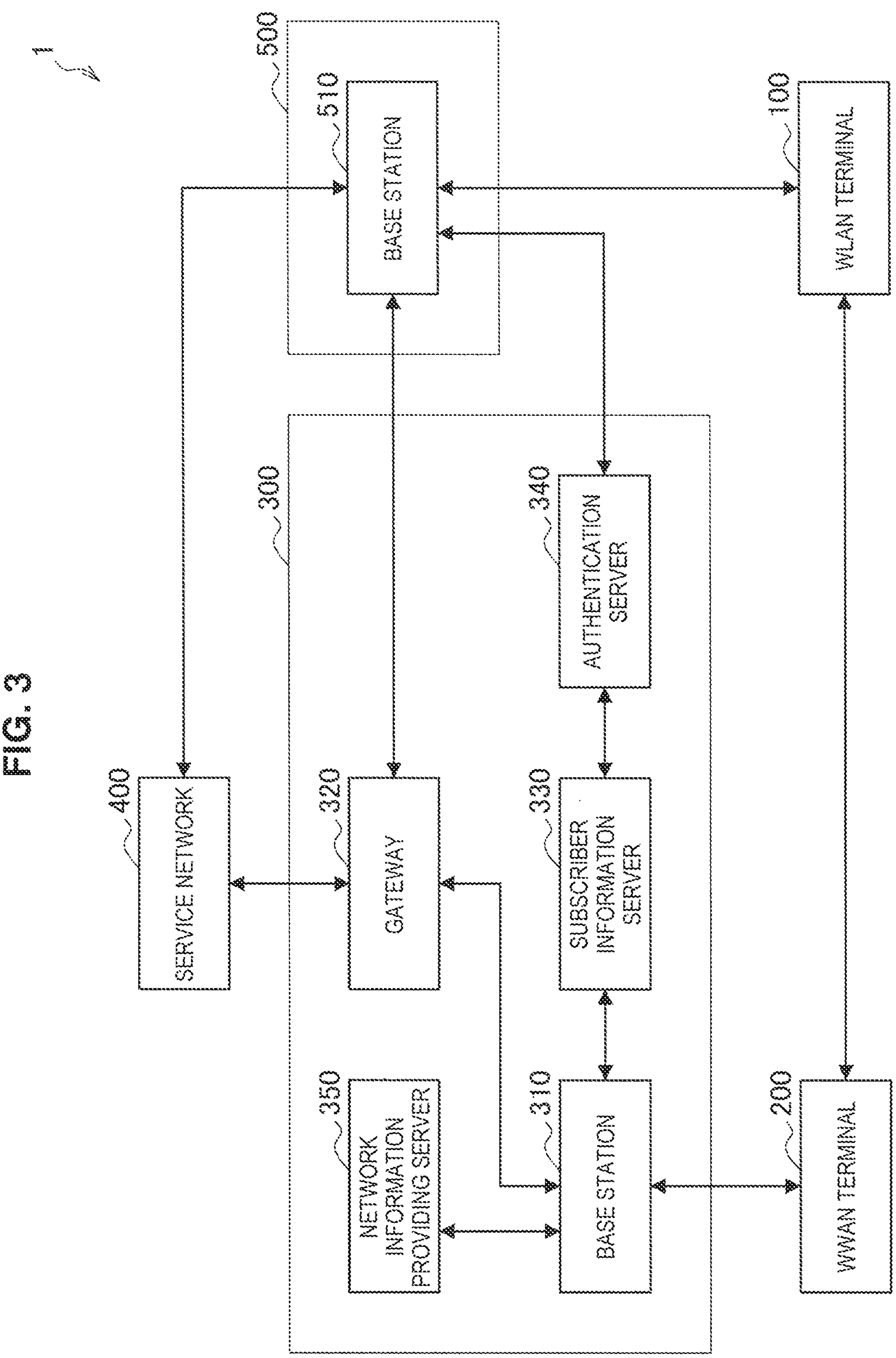
FIG. 3 is a block diagram illustrating an example of a configuration of a wireless communication system according to a first embodiment.

FIG. 3 is a block diagram illustrating an example of a configuration of the wireless communication system 1 according to the present embodiment. As illustrated in FIG. 3, the wireless communication system 1 includes the WLAN terminal 100 and the WWAN terminal 200, and provides wireless connection to the WWAN 300, the WLAN 500, and the service network 400.

(1) WWAN 300

As illustrated in FIG. 3, the WWAN 300 is operated by the base station 310, a gateway 320, a subscriber information server 330, an authentication server 340, and a network information providing server 350.

(1-1) Base Station 310

The base station 310 serves as a contact when a wireless terminal with a WWAN communication function connects to the WWAN 300. For example, the base station 310 accepts connection from the WWAN terminal 200. In LTE, the base station 310 corresponds to an eNB.

(1-2) Gateway 320

The gateway 320 relays communication between the WWAN 300 and another network. For example, the gateway 320 relays communication between the WWAN 300 and the service network 400, and communication between the WWAN 300 and the WLAN 500. In LTE, the gateway 320 corresponds to a packet data network gateway (P-GW).

The WLAN terminal 100, when using the service network 400, communicates with the service network 400 via the base station 510 and the gateway 320. After authentication of the WLAN terminal 100 to the WLAN 500, under communication limitations before the authentication server 340 which will be described below verifies the access right, the gateway 320 does not relay communication between the WLAN terminal 100 and the service network 400. The gateway 320 relays communication between the service network 400 and the WLAN terminal 100 whose access right has been successfully verified by the authentication server 340.

(1-3) Subscriber Information Server 330

The subscriber information server 330 retains subscriber information for the WWAN 300. The subscriber information server 330 also retains information used for an authentication process when a wireless terminal connects to the WWAN 300. In LTE, the subscriber information server 330 corresponds to a home subscriber server (HSS).

(1-4) Authentication Server 340

The authentication server 340 authenticates that connection to the WWAN 300 is connection by a subscriber of the WWAN 300. The authentication server 340 may perform this authentication process referring to the subscriber information server 330. In LTE, the authentication server 340 corresponds to an authentication, authorization and accounting (AAA) server.

The WWAN 300 and the WLAN 500 share subscriber identification information used for authentication. In other words, a terminal that has a WWAN communication function and can connect to the WWAN 300 through an authentication process using the subscriber identification information can also connect to the WLAN 500 through an authentication process using the subscriber identification information. The authentication server 340 performs an authentication process referring to the subscriber information server 330 on both a terminal that performs connection to the WLAN 500 and a terminal that performs connection to the WWAN 300.

The authentication server 430 permits communication in a limited communication environment to the WLAN terminal 100 whose authentication to the WLAN 500 has succeeded. In an environment having communication limitations, the WLAN terminal 100 is permitted, for example, communication with the authentication server 340. With respect to the WLAN terminal 100 whose authentication to the WLAN 500 has succeeded, the authentication server 340 performs verification of the access right (determination of removal of communication limitations). Here, the access right is, for example, an access right to the service network 400. The verification of the access right is performed according to whether or not coincident pairing information is collected from the WLAN terminal 100 and the WWAN terminal 200. The authentication server 340 gives the access right to the WLAN terminal 100 which has succeeded in the verification of the access right. The WLAN terminal 100 which has been given the access right can use the service network 400 through relay of communication by the gateway 320. On the other hand, the authentication server 30 does not give the access right to the WLAN terminal 100 which has failed in the verification of the access right. The WLAN terminal 100 which has not been given the access right cannot go through relay of communication by the gateway 320 and cannot use the service network 400.

(1-5) Network Information Providing Server 350

The network information providing server 350 provides information on a wireless network that is a connection destination, which is needed in switching a connection destination from a wireless network to which a wireless terminal is connected currently to another wireless network. For example, the network information providing server 350 may provide the WWAN terminal 200 with network information for connecting to the WLAN 500. In LTE, the network information providing server 350 corresponds to an ANDSF server.

(2) WLAN 500

As illustrated in FIG. 3, the WLAN 500 is a public network operated by a base station 510. In this specification, a communication scheme of the public network is described to be WLAN, but the public network may be operated according to any other communication scheme, such as Bluetooth.

The base station 510 serves as a contact when a wireless terminal with a WLAN communication function connects to the WLAN 500. For example, the base station 510 accepts connection from the WLAN terminal 100. In the case where a communication scheme of the public network is WLAN, the base station 510 corresponds to an access point.

[2-2. Configuration Example of WLAN Terminal]

Figure 4:
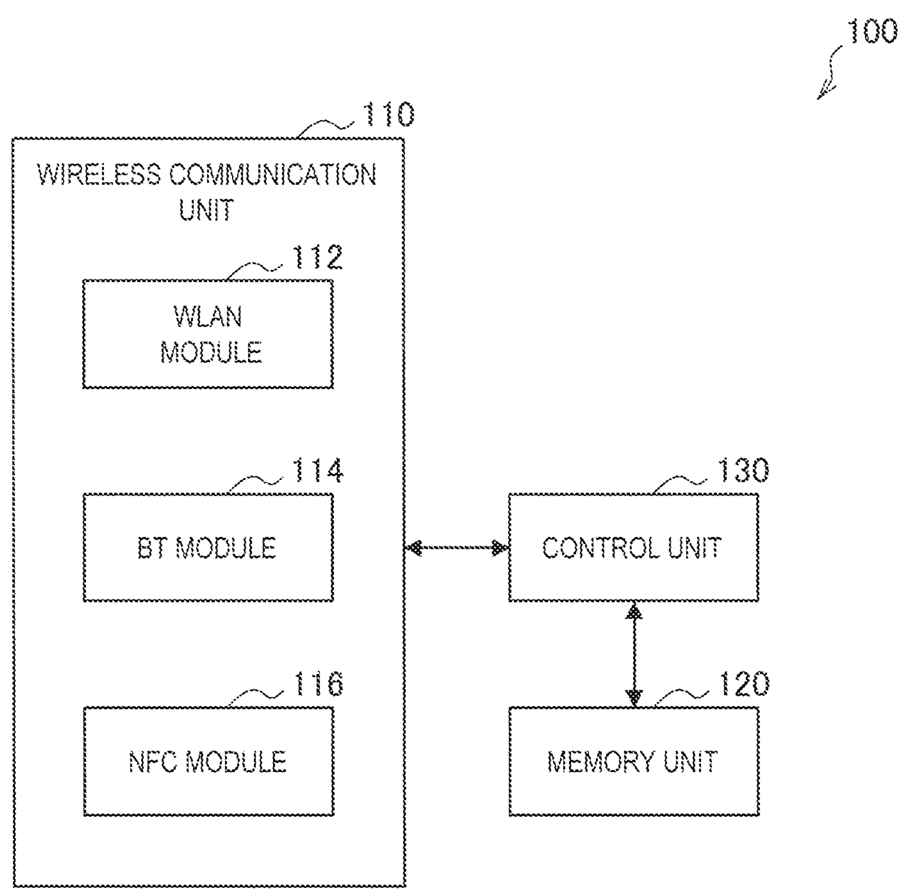
FIG. 4 is a block diagram illustrating an example of a logical configuration of a WLAN terminal according to the first embodiment.

FIG. 4 is a block diagram illustrating an example of a logical configuration of the WLAN terminal 100 according to the present embodiment. As illustrated in FIG. 4, the WLAN terminal 100 includes a wireless communication unit 110, a memory unit 120, and a control unit 130.

(1) Wireless Communication Unit 110

The wireless communication unit 110 is a communication module that transmits and receives data to/from an external device. The wireless communication unit 110 can perform wireless communication using various communication schemes. For example, the wireless communication unit 110 includes a WLAN module 112 and is capable of wireless communication using Wi-Fi (registered trademark), or WLAN. The wireless communication unit 110 also includes a Bluetooth (BT) module 114 and is capable of wireless communication using Bluetooth. The wireless communication unit 110 also includes an NFC module 116 and is capable of wireless communication using NFC.

For example, the wireless communication unit 110 can serve as a first wireless communication unit that performs pairing and wireless communication with the WWAN terminal 200. For example, the wireless communication unit 110 may perform pairing and wireless communication with the WWAN terminal 200 by using a near field wireless communication scheme, such as NFC, Bluetooth, Bluetooth low energy, Wi-Fi direct (registered trademark), WLAN, or the like. Besides, the wireless communication unit 110 may perform pairing and wireless communication with the WWAN terminal 200 by using a near field wireless communication scheme, such as ZigBee (registered trademark), infrared data association (IrDA), or the like. The wireless communication unit 110 outputs information on pairing with the WWAN terminal 200 with which pairing has been established, and stores the pairing information in, for example, the memory unit 120.

The pairing information is information including at least one of identification information for identifying the WWAN terminal 200 with which pairing has been established and identification information for identifying the WLAN terminal 100 itself, a link key generated when the pairing is established, and hash data generated based on the link key. Here, the identification information is device address information that is used for wireless communication between the WWAN terminal 200 and the wireless communication unit 110. For example, when the wireless communication unit 110 performs wireless communication with the WWAN terminal 200 using Bluetooth, the pairing information includes Bluetooth device addresses (BD_ADDRs) of both the WWAN terminal 200 and the WLAN terminal 100. As another example, when the wireless communication unit 110 performs wireless communication with the WWAN terminal 200 using Wi-Fi direct, the pairing information includes P2P device addresses of both the WWAN terminal 200 and the WLAN terminal 100. The link key is information that is automatically generated when the pairing is established. For example, in Bluetooth, the link key is represented by a 128-bit random number. In addition, in Wi-Fi direct, the link key is represented by a 64-bit hexadecimal number. The hash data is short data that is generated by a specific algorithm, and can be generated using an algorithm, for example, CRC, MD5, SHA1, SHA256, or the like.

For example, the wireless communication unit 110 may serve as a second wireless communication unit that connects to a public network to perform wireless communication. For example, the wireless communication unit 110 connects to the WLAN 500 using a wireless communication scheme, such as WLAN. The public network may support any wireless communication scheme other than WLAN, and in that case, the wireless communication unit 110 may connect to the public network using a wireless communication scheme corresponding to the public network. For example, the wireless communication unit 110 may transmit the pairing information to the authentication server 340 using the WLAN 500. In addition, the wireless communication unit 110 may measure a reception radio wave intensity indicating the intensity of a signal received from the WLAN 500.

The wireless communication unit 110 may perform wireless communication with the WWLAN terminal 200 and a public network by using the same communication scheme. For example, the wireless communication unit 110 may communicate with the WWAN terminal 200 by using a WLAN and connect to the WLAN 500.

(2) Memory Unit 120

The memory unit 120 performs recording and reproduction of data on a predetermined recording medium. For example, the memory unit 120 stores information received from the WWAN terminal 200 by the wireless communication unit 110. For example, the memory unit 120 stores information on pairing with the WWAN terminal 200 with which pairing has been established in the past.

(3) Control Unit 130

The control unit 130 serves as an arithmetic processor and a controller, and controls the overall operation in the WLAN terminal 100 according to various programs.

For example, in order to remove limitations on communication with the WLAN 500, the control unit 130 controls the wireless communication unit 110 to transmit the information on pairing with the WWAN terminal 200. In an environment having communication limitations, the WLAN terminal 100 is permitted communication for determination of removal of the communication limitations as communication using the WLAN 500. For example, as an example of communication under communication limitations after authentication to the WLAN 500, the control unit 130 transmits the pairing information to the authentication server 340 via the base station 510. The control unit 130 may encrypt the pairing information and cause transmission of the encrypted pairing information. In this case, security can be improved.

Based on whether or not pairing information coincident with the pairing information transmitted by the WLAN terminal 100 has been transmitted from the WWAN terminal 200, verification of the access right (determination of removal of the communication limitations) is performed. For example, when coincident pairing information has been transmitted from both the WLAN terminal 100 and the WWAN terminal 200, the communication limitations are removed, and otherwise, the communication limitations are not removed. Therefore, unless the WLAN terminal 100 and the WWAN terminal 200 have established pairing, the communication limitations are not removed, and thus spoofing is more reliably prevented compared to the case of simply managing the access right using a MAC address. Verification of the access right is performed by, for example, the authentication server 340.

In general, when the WLAN terminal 100 not having subscriber identification information connects to the WLAN 500, the communication service provider (an administrator of the wireless communication system 1) performs access control using a MAC address of the WLAN terminal 100 (WLAN module) in many cases. However, this scheme has the risk of suffering from damage from spoofing due to rewriting of the MAC address or the like. In contrast, the wireless communication system 1 according to the present embodiment performs access control using pairing information. This allows the communication service provider to specify subscriber identification information of the WWAN terminal 200 which has been paired with the WLAN terminal 100, and it is possible to reduce the risk of spoofing.

In addition, assuming that a plurality of WLAN terminals 100 connect to a public WLAN using subscriber identification information of a single WWAN terminal 200, access control using pairing information will be examined. When performing access control using a MAC address, the communication service provider can determine that a single subscriber is attempting to connect a plurality of WLAN terminals 100 having different MAC addresses to a public WLAN. However, when the WLAN terminals 100 do not perform EAP authentication, it is difficult for the communication service provider to specify which devices are the WLAN terminals 100 attempting to connect to the public WLAN. In contrast, when performing access control using pairing information, the communication service provider can specify relationships between the WWAN terminal 200 and the WLAN terminals 100 by means of the pairing information even if the WLAN terminals 100 do not perform EAP authentication. This allows the communication service provider to readily perform access management, limitation of the number of terminals, billing management, and the like, and to provide a precise service.

The control unit 130 may control the wireless communication unit 110 to transmit type information indicating the type (game device, video camera, or the like) of the WLAN terminal 100. For example, the control unit 130 transmits the type information to the authentication server 340 via the base station 510. The control unit 130 may transmit the type information and the pairing information simultaneously or at different timings, or the type information may be included in the pairing information. The communication service provider becomes able to specify the type of the WLAN terminal 100 based on the type information, and provide a capacity, a billing plan, and the like of a demanded communication line according to the type of the WLAN terminal 100.

As authentication to the WLAN 500, the control unit 130 may perform an authentication process using subscriber identification information. For example, the control unit 130 performs authentication to the WLAN 500 by means of extensible authentication protocol (EAP) authentication using subscriber identification information of the WWAN terminal 200. Specifically, for example, the control unit 130 receives authentication information based on subscriber identification information from the WWAN terminal 200 by the wireless communication unit 110, and performs authentication to the WLAN 500 using the authentication information by the wireless communication unit 110. Specifically, the control unit 130 controls a relay process of relaying messages transmitted and received between the WWAN terminal 200 and the WLAN 500 for an authentication process to be performed by the WWAN terminal 200. For example, the control unit 130 transmits a message (first message) for authentication to the WLAN 500, which has been received by the wireless communication unit 110, to the WWAN terminal 200 by the wireless communication unit 110. This message is, for example, a message requesting generation of authentication information. In addition, the control unit 130 transmits a message (second message) including authentication information generated by the WWAN terminal 200, which has been received from the WWAN terminal 200 by the wireless communication unit 110, to the base station 510 operating the WLAN 500 by the wireless communication unit 110.

The messages relayed by the WLAN terminal 100 may be messages for an authentication process using extensible authentication protocol (EAP). For example, the first message may be EAP-Request/Identity, and the second message may be EAP-Response/Identity. Further, the first message may be EAP-Request/AKA-Challenge, and the second message may be EAP-Response/AKA-Challenge. In this specification, description is given on an example in which EAP-AKA is used as an example of an authentication protocol, but another authentication protocol using subscriber information for an authentication process, such as EAP-SIM or EAP-AKA', may be used.

By means of EAP authentication, a switch of networks of a connection destination is performed without requiring a user operation. As described above, since the WLAN terminal 100 continues a search even after being connected to the WLAN 500 and switches networks of the connection destination, user convenience is improved due to EAP authentication which does not require a user operation.

Through the above-described relay process of messages, the control unit 130 can cause the WWAN terminal 200 to, as a proxy, perform an authentication process to the WLAN 500 using EAP. Therefore, the WLAN terminal 100 can connect to the WLAN 500 easily even without subscriber identification information.

The control unit 130 may select the information on pairing with the WWAN terminal 200 having subscriber identification information used for EAP authentication from the memory unit 120 as a target of transmission by the wireless communication unit 110. Accordingly, when a plurality of pieces of pairing information are stored in the memory unit 120, it is possible to avoid transmission of unnecessary pairing information which cannot coincide with pairing information transmitted from the WWAN terminal 200.

A configuration example of the WLAN terminal 100 according to the present embodiment has been described above. Subsequently, a configuration example of the WWAN terminal 200 according to the present embodiment will be described.

[2-3. Configuration Example of WWAN Terminal]

Figure 5:
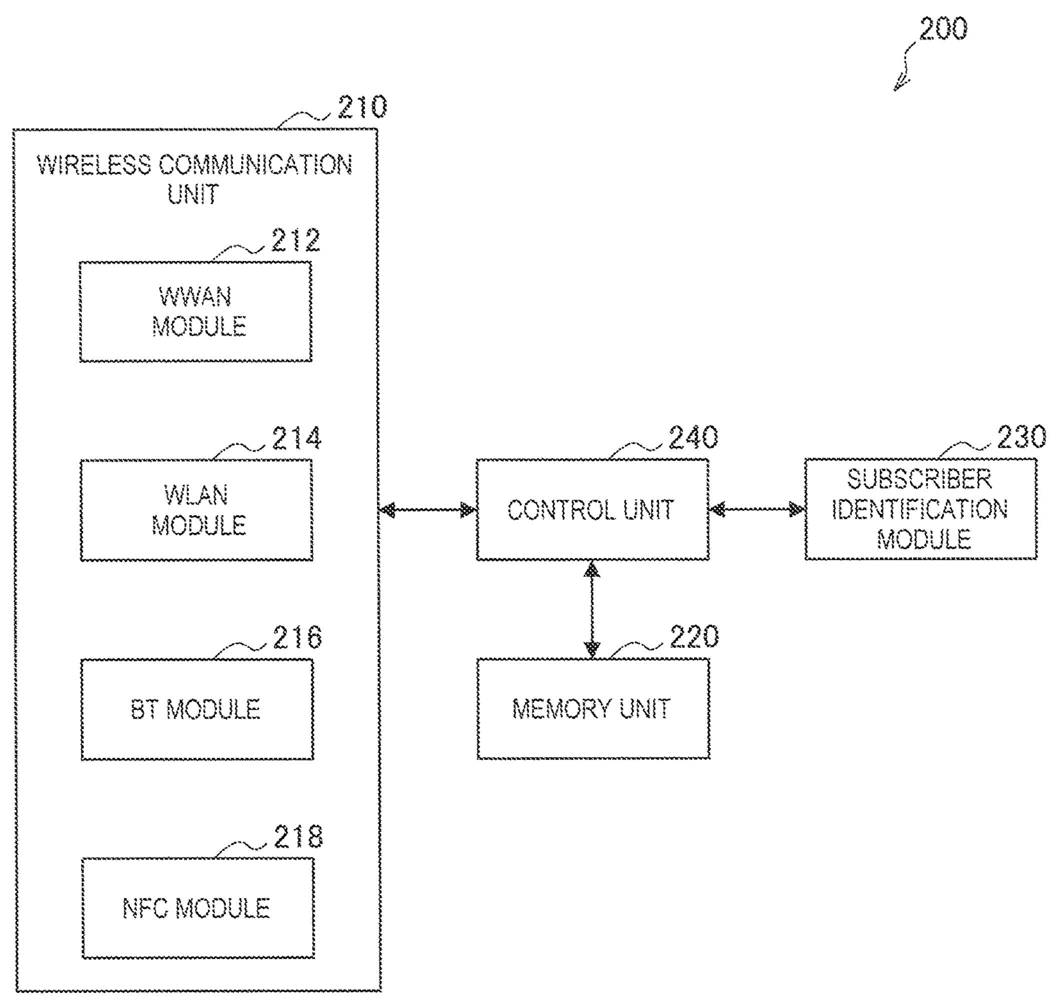
FIG. 5 is a block diagram illustrating an example of a logical configuration of a WWAN terminal according to the first embodiment.

FIG. 5 is a block diagram illustrating an example of a logical configuration of the WWAN terminal 200 according to the present embodiment. As illustrated in FIG. 5, the WWAN terminal 200 includes a wireless communication unit 210, a memory unit 220, a subscriber identification module 230, and a control unit 240.

(1) Wireless Communication Unit 210

The wireless communication unit 210 is a communication module that transmits and receives data to/from an external device. The wireless communication unit 210 can perform wireless communication using various communication schemes. For example, the wireless communication unit 210 includes a WWAN module 212 and is capable of wireless communication using WWAN 300. The wireless communication unit 210 also includes a WLAN module 214 and is capable of wireless communication using Wi-Fi, or WLAN.

The wireless communication unit 210 also includes a BT module 216 and is capable of wireless communication using Bluetooth. The wireless communication unit 210 also includes an NFC module 218 and is capable of wireless communication using NFC.

For example, the wireless communication unit 210 can serve as a second wireless communication unit that performs pairing and wireless communication with the WLAN terminal 100. For example, the wireless communication unit 210 can perform pairing and wireless communication with the WLAN terminal 100 using a near field wireless communication scheme, such as NFC, Bluetooth, Bluetooth low energy, Wi-Fi direct, WLAN, or the like. Besides, the wireless communication unit 210 may perform pairing and wireless communication with the WLAN terminal 100 using a near field wireless communication scheme, such as ZigBee, infrared data association (IrDA), or the like. In addition, the wireless communication unit 210 can serve as a first wireless communication unit that connects to the WWAN 300 by means of the WWAN module 212 to perform wireless communication.

(2) Memory Unit 220

The memory unit 220 performs recording and reproduction of data on a predetermined recording medium. For example, the memory unit 220 stores information received from the WWAN 300 by the wireless communication unit 210. For example, the memory unit 220 stores information on pairing with the WLAN terminal 100 with which pairing has been established in the past.

(3) Subscriber Identification Module 230

The subscriber identification module 230 serves as a storage unit that stores subscriber identification information for the WWAN 300. For example, the subscriber identification module 230 is implemented by a SIM card.

(4) Control Unit 240

The control unit 240 serves as an arithmetic processor and a controller, and controls the overall operation in the WWAN terminal 200 according to various programs.

For example, in order to remove limitations on communication of the WLAN terminal 100 with the WLAN 500, the control unit 240 controls the wireless communication unit 210 to transmit information on pairing with the WLAN terminal 100. For example, the WWAN terminal 200 transmits the pairing information to the authentication server 340 via the base station 310. The control unit 240 may encrypt the pairing information and cause transmission of the encrypted pairing information. In this case, security can be improved.

For example, the control unit 240 may perform an authentication process for authentication of the WLAN terminal 100 to the WLAN 500. Specifically, the control unit 240 generates authentication information based on subscriber identification information stored in the subscriber identification module 230, and transmits the authentication information to the WLAN terminal 100 by the wireless communication unit 210. More specifically, the control unit 240 performs an authentication process on the basis of a message relayed by the WLAN terminal 100. For example, the control unit 240 generates authentication information by performing an authentication process on the basis of a message (first message) for authentication of the WLAN terminal 100 to the WLAN 500, which has been received from the WLAN terminal 100 by the wireless communication unit 210. This message is, for example, a message requesting generation of authentication information. In addition, the control unit 240 transmits a message (second message) including the generated authentication information to the WLAN terminal 100 by the wireless communication unit 210.

The control unit 240 may generate authentication information by performing an authentication process using EAP on the basis of a message relayed by the WLAN terminal 100. As described above, the control unit 240 may perform an authentication process using any authentication protocol using subscriber information for an authentication process, such as EAP-AKA, EAP-SIM, or EAP-AKA'. By receiving a message relayed by the WLAN terminal 100, the control unit 240 can, as a proxy for the WLAN terminal 100, perform an authentication process to the WLAN 500 using EAP. Therefore, even when the WLAN terminal 100 does not have subscriber identification information, the WWAN terminal 200 allows the WLAN terminal 100 to connect to the WLAN 500 easily. Moreover, the WWAN terminal 200 does not transmit subscriber identification information or the like directly to the WLAN terminal 100, which ensures security.

The control unit 240 can transmit the pairing information at various timings. For example, when EAP authentication to the WLAN 500 by the WLAN terminal 100 using subscriber identification information stored in the subscriber identification module 230 succeeds, the control unit 240 may control the wireless communication unit 210 to transmit the pairing information. A timing at which verification of the access right relating to the WLAN terminal 100 is performed is after the EAP authentication to the WLAN 500 succeeds. For this reason, when the WWAN terminal 200 transmits the pairing information according to the success of the EAP authentication, it is possible to avoid unnecessary transmission of the pairing information. Needless to say, the control unit 240 may transmit the pairing information before success of the EAP authentication, such as at a timing when the pairing is established, at regular timings, and the like.

Further, the control unit 240 may select information on pairing with the WLAN terminal 100 that has performed EAP authentication from the memory unit 220 as a target of transmission by the wireless communication unit 210. Accordingly, when a plurality of pieces of pairing information are stored in the memory unit 220, it is possible to avoid transmission of unnecessary pairing information which cannot coincide with pairing information transmitted from the WLAN terminal 100.

A configuration example of the WWAN terminal 200 according to the present embodiment has been described above. Subsequently, a configuration example of the authentication server 340 according to the present embodiment will be described.

[2-4. Configuration Example of Authentication Server]

Figure 6:
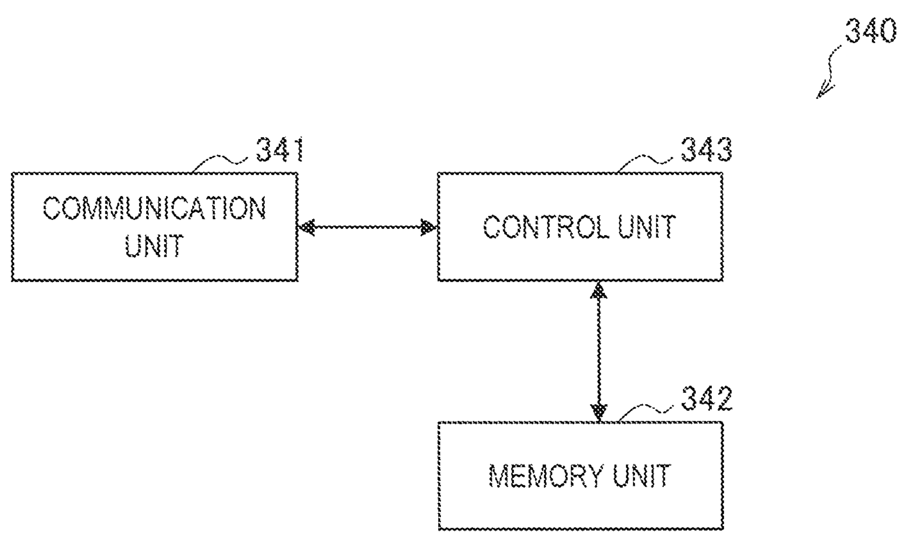
FIG. 6 is a block diagram illustrating an example of a logical configuration of an authentication server according to the first embodiment.

FIG. 6 is a block diagram illustrating an example of a logical configuration of the authentication server 340 according to the present embodiment. As illustrated in FIG. 6, the authentication server 340 includes a communication unit 341, a memory unit 342, and a control unit 343.

(1) Communication Unit 341

The communication unit 341 is a communication module that transmits and receives data to/from an external device. The communication unit 341 can perform wireless communication using various wired/wireless communication schemes. The communication unit 341 according to the present embodiment performs communication with the WWAN terminal 200 that connects to the WWAN 300 to perform wireless communication and the WLAN terminal 100 that connects to the WLAN 500 to perform wireless communication, directly or indirectly via an arbitrary communication node. The communication unit 341 receives pairing information from the WLAN terminal 100 or the WWAN terminal 200.

(2) Memory Unit 342

The memory unit 342 is a portion that performs recording and reproduction of data on a predetermined recording medium. For example, the memory unit 342 stores information received from the WLAN terminal 100 or the WWAN terminal 200 by the communication unit 341. Specifically, the memory unit 342 stores pairing information received from the WLAN terminal 100 or the WWAN terminal 200. The memory unit 342 may store the received pairing information until a time for providing a communication service to the WLAN terminal 100 elapses and destroy the stored pairing information after the time elapses.

(2) Control Unit 343

The control unit 343 serves as an arithmetic processor and a controller, and controls the overall operation in the authentication server 340 according to various programs.

For example, the control unit 343 performs an authentication process of the WLAN terminal 100 to the WLAN 500 with reference to the subscriber information server 330. When the authentication succeeds, the control unit 343 permits the WLAN terminal 100 communication in a limited communication environment.

In addition, with respect to the WLAN terminal 100 whose communication in a communication environment has been permitted, the control unit 343 performs verification of the access right. For example, the control unit 343 performs verification of the access right using first pairing information received from the WWAN terminal 200 (first wireless terminal) by the communication unit 341 and second pairing information received from the WLAN terminal 100 (second wireless terminal) by the communication unit 341. Specifically, based on whether or not the first pairing information and the second pairing information coincide, the control unit 343 determines whether or not to remove limitations on communication of the WLAN terminal 100 with the WLAN 500. For example, when the same combination of identification information (BD_ADDRs, P2P device addresses, or the like) is included in each of the first pairing information and the second pairing information, the control unit 343 determines that the first pairing information and the second pairing information coincide. Besides, when the same link key or the same hash data is included in the first pairing information and the second pairing information, the control unit 343 may determine that the first pairing information and the second pairing information coincide. The control unit 343 may combine a determination using identification information and a determination using link keys, or may use any one of the determinations. The control unit 343 gives the access right to the WLAN terminal 100 that has succeeded in verification of the access right, and does not give the access right to the WLAN terminal 100 that has failed in authentication of the access right. The control unit 343 may perform verification of the access right using a MAC address in addition to pairing information.

A configuration example of the authentication server 340 according to the present embodiment has been described above. Subsequently, an operation of the wireless communication system 1 according to the present embodiment will be described with reference to FIG. 7 to FIG. 9.

[2-5. Operation Process]

(1) Connection Process

Figure 7:
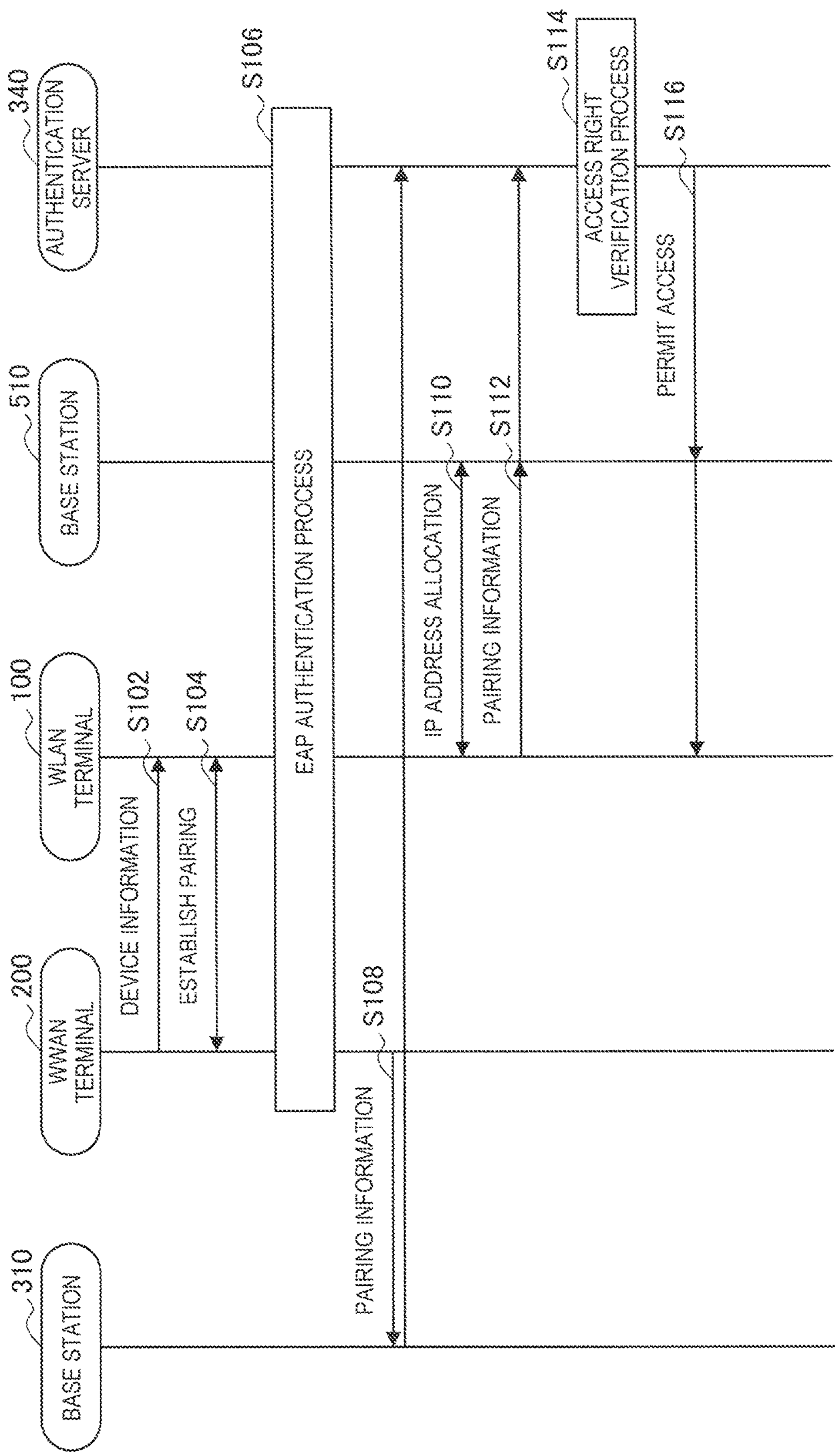
FIG. 7 is a sequence diagram illustrating an example of the flow of a connection process executed in a wireless communication system according to the first embodiment.

FIG. 7 is a sequence diagram illustrating an example of the flow of a connection process executed in the wireless communication system 1 according to the present embodiment. As illustrated in FIG. 7, the present sequence involves the base station 310, the WWAN terminal 200, the WLAN terminal 100, the base station 510, and the authentication server 340.

As illustrated in FIG. 7, first in step S102, the WWAN terminal 200 transmits device information to the WLAN terminal 100. For example, when the WWAN terminal 200 and the WLAN terminal 100 perform pairing using Bluetooth, the WWAN terminal 200 transmits its BD_ADDR as device information. In addition, when the WWAN terminal 200 and the WLAN terminal 100 perform pairing using Wi-Fi direct, the WWAN terminal 200 transmits its P2P device address as device information. For example, the WWAN terminal 200 may use the NFC module 218 to transmit the device information. Besides, the WWAN terminal 200 may display a QR code (registered trademark), a barcode, or the like in which device information is embedded by means of a display unit or the like that is not shown, and the WLAN terminal 100 may read the device information by means of an image sensor that is not shown. Transmission of device information may be performed from the WLAN terminal 100 to the WWAN terminal 200.

Next, in step S104, the WLAN terminal 100 and the WWAN terminal 200 establish pairing. For example, the WLAN terminal 100 and the WWAN terminal 200 establish a communication path using the device information obtained in step S102 above. For example, the WLAN terminal 100 and the WWAN terminal 200 establish a communication path using Bluetooth, Wi-Fi direct, NFC, or the like.

Next, in step S106, the WLAN terminal 100 performs authentication to the WLAN 500 by means of an EAP authentication process. Since this process will be described below with reference to FIG. 8 and FIG. 9, detailed description is omitted here. For the EAP authentication process, the communication path of Bluetooth, Wi-Fi direct, NFC, or the like has been established already between the WLAN terminal 100 and the WWAN terminal 200 in step S104, and thus messages for the EAP authentication process are transmitted and received using this communication path.

Next, in step S108, the WWAN terminal 200 transmits pairing information to the authentication server 340 via the base station 310. The pairing information transmitted here includes identification information of the WWAN terminal 200 itself and the WLAN terminal 100 that is the pairing partner. The WWAN terminal 200 may selectively transmit the information on pairing with the WLAN terminal 100 that has performed the EAP authentication in step S106 above.

Next, in step S110, the WLAN terminal 100 executes IP address allocation with the base station 510 to acquire an IP address. The WLAN terminal 100 is subjected to communication limitations under which communication for verification of the access right is possible but it is not possible to use the service network 400.

Next, in step S112, the WLAN terminal 100 transmits pairing information to the authentication server 340 via the base station 510. The pairing information transmitted here includes identification information of the WLAN terminal 100 itself and the WWAN terminal 200 that is the pairing partner. The WLAN terminal 100 may selectively transmit the information on pairing with the WWAN terminal 200 which has subscriber identification information used for the EAP authentication of step S106 above.

Then, in step S114, the authentication server 340 performs a verification process of the access right. For example, the authentication server 340 compares the pairing information received from the WWAN terminal 200 in step S108 above and the pairing information received from the WLAN terminal 100 in step S112 above and determines whether or not the same combination of identification information is included. The authentication server 340 determines that the verification has succeeded when the same combination of identification information is included, and determines that the verification has failed when the same combination of identification information is not included. Besides, the authentication server 340 may compare the pairing information received from the WWAN terminal 200 in step S108 above and the pairing information received from the WLAN terminal 100 in step S112 above and determine whether or not the same link key or the same hash data is included. Then, the authentication server 340 determines that the verification has succeeded when the same link key or the same hash data is included, and determines that the verification has failed when the same link key or the same hash data is not included.

In the case of success in the verification, in step S116, the authentication server 340 gives the access right to the WLAN terminal 100 and permits access. In the case of failure in the verification, the authentication server 340 does not give the access right to the WLAN terminal 100 and rejects use of the service network 400 by the WLAN terminal 100.

An example of a connection process according to the present embodiment has been described above. Subsequently, the EAP authentication process (step S106 of FIG. 7) will be described in detail with reference to FIG. 8 and FIG. 9.

(2) EAP Authentication Process

Figure 8:
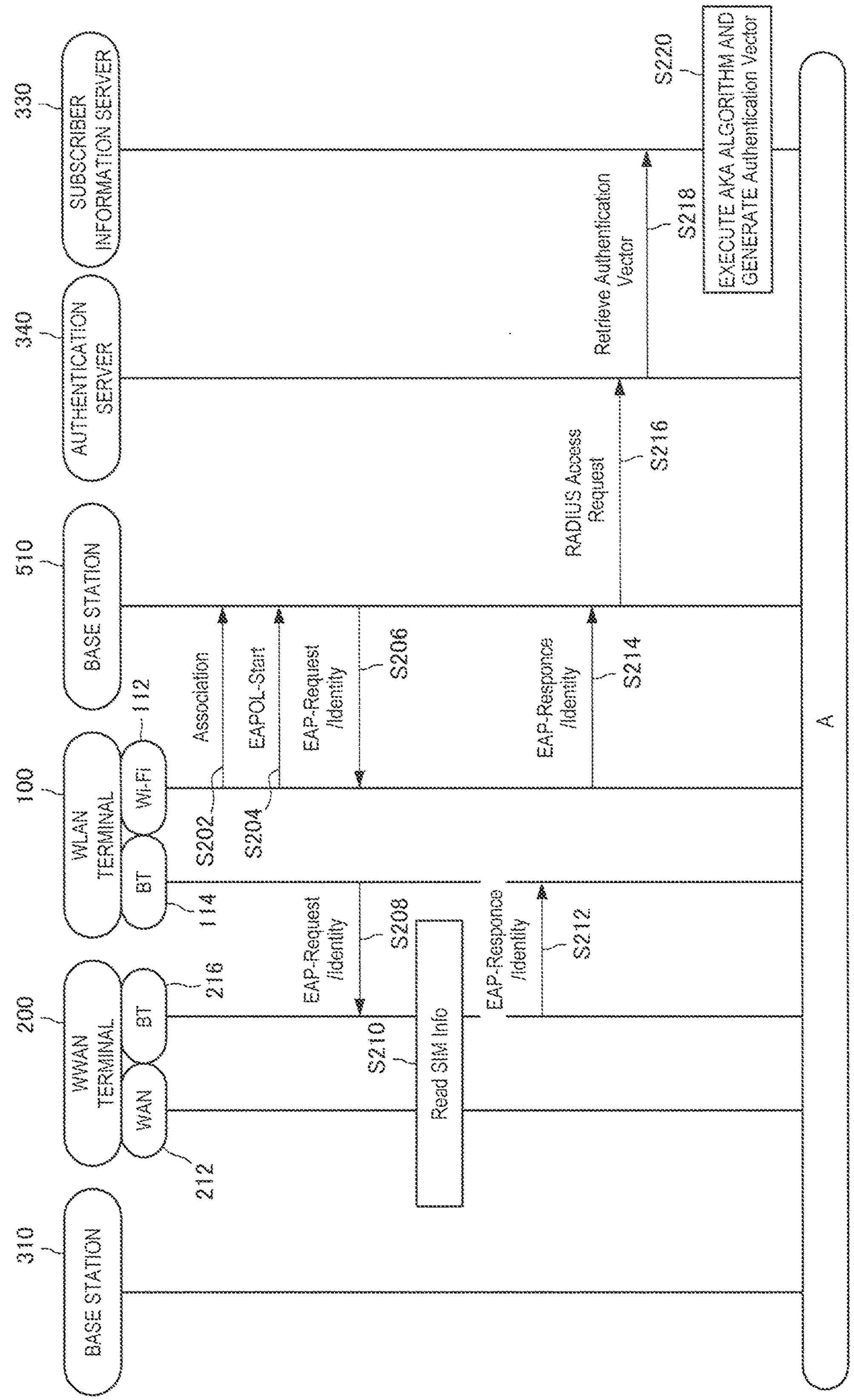
FIG. 8 is a sequence diagram illustrating an example of the flow of an EAP authentication process executed in the wireless communication system according to the first embodiment.
Figure 9:
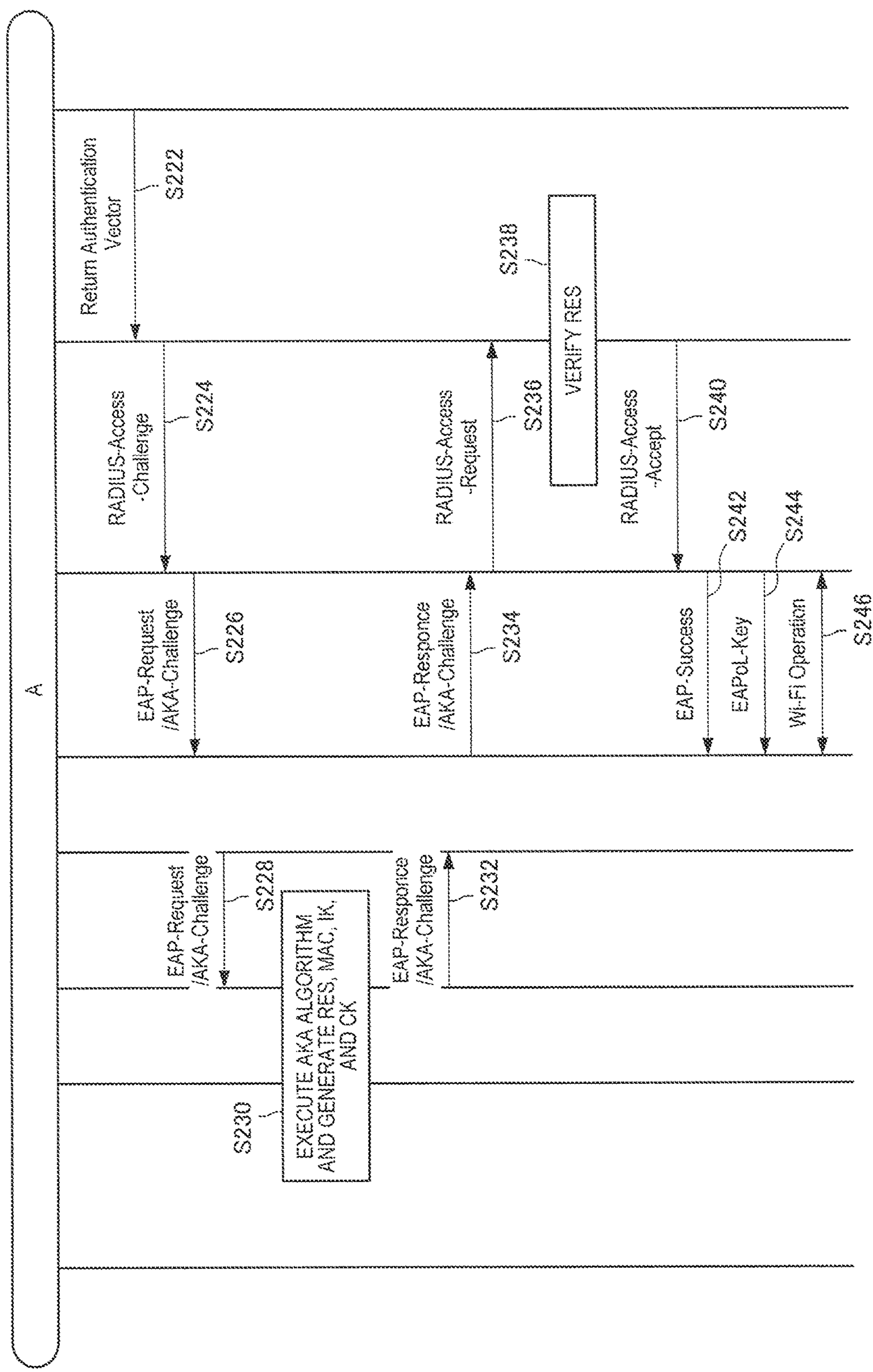
FIG. 9 is a sequence diagram illustrating an example of the flow of an EAP authentication process executed in the wireless communication system according to the first embodiment.

FIG. 8 and FIG. 9 are sequence diagrams illustrating an example of the flow of an EAP authentication process executed in the wireless communication system 1 according to the present embodiment. As illustrated in FIG. 8 and FIG. 9, the sequence involves the base station 310, the WWAN terminal 200, the WLAN terminal 100, the base station 510, the authentication server 340, and the subscriber information server 330. Regarding the WLAN terminal 100 and the WWAN terminal 200, communication modules used in message exchange are mentioned without the word "module." For example, messages having the WLAN (Wi-Fi) module 112 as a starting point or an end point indicate that the messages are transmitted or received by the WLAN module 112. This is the same for the BT module 114, the WWAN module 212, and the BT module 216.

Here, as described above, the communication path has been established between the WLAN terminal 100 and the WWAN terminal 200, and messages for the EAP authentication process are transmitted and received using the communication path. As an example, in the present sequence, it is assumed that wireless connection using Bluetooth has been established for tethering between the WLAN terminal 100 and the WWAN terminal 200. Needless to say, the wireless connection may be established according to an arbitrary communication scheme other than Bluetooth, for example, Wi-Fi direct or the like.

As illustrated in FIG. 8, first, in step S202, the WLAN terminal 100 performs association with the base station 510. By the association, the WLAN terminal 100 establishes logical connection for an authentication process. The WLAN terminal 100 cannot yet perform operation other than an authentication process, such as data communication.

Then, in step S204, the WLAN terminal 100 transmits EAPoL-Start to the base station 510.

Further, in step S206, the base station 510 transmits EAP-Request/Identity to the WLAN terminal 100.

Next, in step S208, the WLAN terminal 100 transmits EAP-Request/Identity received in step S206 to the WWAN terminal 200. This message requests the WWAN terminal 200 to generate Identity needed in EAP-AKA.

Then, in step S210, the WWAN terminal 200 generates Identity referring to its own subscriber identification module 230. For example, the control unit 240 generates Identity on the basis of information recorded on a SIM card serving as the subscriber identification module 230. In the case where the authentication protocol is EAP-AKA, Identity is generated on the basis of IMSI.

IMSI has the following format.

<MCC: 3 digits><MNC: 2 or 3 digits><MSIN: 10 digits at maximum>

Here, Mobile Country Code (MCC) is information indicating a country, Mobile Network Code (MNC) is information indicating a carrier, and Mobile Subscriber Identification Number (MSIN) is information indicating a subscriber identification code.

Identity has the following format.

0<IMSI>@wlan.mnc<MNC>.mcc<MCC>0.3gppnetwork.org

For example, assuming that MNC has three digits and IMSI is "123456012345678", Identity is "0123456012345678@wlan.mnc456.mcc123.3gppnetwork.org". Description has been given on the Identity generation process in step S210.

Next, in step S212, the WWAN terminal 200 returns EAP-Response/Identity to the WLAN terminal 100. This message stores Identity generated in step S210.

Then, in step S214, the WLAN terminal 100 transfers the received EAP-Response/Identity to the base station 510.

Next, in step S216, the base station 510 transmits RADIUS-Access-Request to the authentication server 340. This message stores Identity generated by the WWAN terminal 200.

Then, in step S218, the authentication server 340 transmits Retrieve-Authentication-Vector to the subscriber information server 330, to request an authentication vector for Identity. This message stores Identity generated by the WWAN terminal 200. An authentication vector is a set of information needed in authenticating a terminal that has connected, and includes the following information in EAP-AKA.

RAND: A random value. Used as a challenge.

AUTN: A value for a terminal to authenticate a network.

XRES: A response value expected in response to a challenge.

IK: Message integrity verification key.

CK: Message encryption key.

Next, in step S220, the subscriber information server 330 executes AKA algorithm to generate an authentication vector corresponding to Identity stored in the received message.

Then, as illustrated in FIG. 9, in step S222, the subscriber information server 330 transmits the generated authentication vector to the authentication server 340.

Next, in step S224, the authentication server 340 transmits RADIUS-Access-Challenge to the base station 510. This message stores the authentication vector generated by the subscriber information server 330. Here, the authentication server 340 newly calculates Message Authentication Code (MAC), and adds it to the message. This MAC is used for the WLAN terminal 100 to verify the integrity of the message.

Then, in step S226, the base station 510 transmits EAP-Request/AKA-Challenge to the WLAN terminal 100. This message includes RAND and AUTN of the authentication vector, and MAC. XRES, IK, and CK of the authentication vector are retained by the base station 510, not being transmitted to the WLAN terminal 100.

Next, in step S228, the WLAN terminal 100 transmits EAP-Request/AKA-Challenge to the WWAN terminal 200. This message requests the WWAN terminal 200 to generate a response value (RES) and session keys (IK, CK).

Then, in step S230, the WWAN terminal 200 executes AKA algorithm to generate RES, MAC, and session keys (IK, CK) corresponding to the received EAP-Request/AKA-Challenge.

Next, in step S232, the WWAN terminal 200 transmits EAP-Response/AKA-Challenge to the WLAN terminal 100. This message stores RES, MAC, and the session keys generated by the WWAN terminal 200.

Then, in step S234, the WLAN terminal 100 transfers the received EAP-Response/AKA-Challenge to the base station 510.

Next, in step S236, the base station 510 transmits RADIUS-Access-Request to the authentication server 340. This message stores RES, MAC, and the session keys (IK, CK) generated by the WWAN terminal 200.

Then, in step S238, the authentication server 340 verifies the received RES. Specifically, the authentication server 340 verifies the integrity of the message on the basis of the coincidence between RES generated by the WWAN terminal 200 and XRES generated by the subscriber information server 330, and MAC.

Next, in step S240, the authentication server 340 transmits RADIUS-Access-Accept to the base station 510. This message indicates permission for connection.

Then, in step S242, the base station 510 transmits EAP-Success to the WLAN terminal 100. This message reports to the WLAN terminal 100 that the authentication process has succeeded.

Next, in step S244, the base station 510 transmits EAPoL-Key to the WLAN terminal 100. This message sends a key for encrypted communication to be used between the WLAN terminal 100 and the base station 510.

Through the above-described EAP authentication process, connection for WLAN communication is completed between the WLAN terminal 100 and the base station 510 in step S246. Thus, data communication using Wi-Fi, for example, is started between the WLAN terminal 100 and the base station 510.

An example of an EAP authentication process according to the present embodiment has been described above.

3. SECOND EMBODIMENT

The present embodiment is a form of a comparison of pairing information (hereinafter referred to as a pairing confirmation process), which is a part of a verification process of the access right, in at least either of the WLAN terminal 100 and the WWAN terminal 200. A wireless communication system 1 according to the present embodiment has the same function and structure as the wireless communication system 1 according to the first embodiment. Distinguishing configurations of the wireless communication system 1 according to the present embodiment will be described below.

[3-1. Configuration Example of WLAN Terminal]

(1) Wireless Communication Unit 110

When the WLAN terminal 100 performs a pairing confirmation process, the wireless communication unit 110 receives a pairing confirmation request from the authentication server 340 and returns a pairing confirmation response. When the WWAN terminal 200 performs a pairing confirmation process, the wireless communication unit 110 transmits pairing information to the authentication server.

A pairing confirmation request is information that requests confirmation of whether or not pairing with a specific wireless terminal has been established. For example, the pairing confirmation request includes pairing information in which one side of pairing is the WLAN terminal 100 itself and the other side is the WWAN terminal 200. A pairing confirmation response is response information indicating confirmation results corresponding to a pairing confirmation request.

(2) Control Unit 130

The control unit 130 according to the present embodiment has a function of performing a pairing confirmation process. For example, the control unit 130 generates a pairing confirmation response indicating whether or not pairing with a wireless terminal indicated by the pairing confirmation request received by the wireless communication unit 110 has been established, and causes the wireless communication unit 110 to return the pairing confirmation response. In this way, when the WLAN terminal 100 performs a pairing confirmation process, processing load in the authentication server 340 is reduced. It is possible to conceive various methods for confirming whether or not pairing has been established.

For example, the control unit 130 may generate a pairing confirmation response based on whether or not pairing with the wireless terminal indicated by the pairing confirmation request has been established in the past. For example, the control unit 130 confirms whether or not the same combination of pairing information as a combination of pairing information included in the pairing confirmation request has been stored in the memory unit 120. Then, the control unit 130 generates a pairing confirmation response that the pairing confirmation has succeeded when the same combination of pairing information has been stored, and generates a pairing confirmation response that the pairing confirmation has failed when the same combination of pairing information has not been stored.

Further, the control unit 130 may generate a pairing confirmation response based on whether or not wireless connection with the wireless terminal indicated by the pairing confirmation request succeeds. For example, the control unit 130 makes a connection request to the WWAN terminal 200 indicated by the pairing confirmation response. Then, the control unit 130 generates a pairing confirmation response that the pairing confirmation has succeeded when the connection succeeds, and generates a pairing confirmation response that the pairing confirmation has failed when the connection fails. When this method is employed, the pairing confirmation process is performed based on the current relationship between the WLAN terminal 100 and the WWAN terminal 200 as well as the past relationship. For this reason, even when pairing has been established in the past, the wireless communication system 1 can give a suitable access right according to a situation change, such as the case where owners of both the terminals are currently different, and the like.

[3-2. Configuration Example of WWAN Terminal]

(1) Wireless Communication Unit 210

When the WWAN terminal 200 performs verification of the access right, the wireless communication unit 210 receives a pairing confirmation request from the authentication server 340 and returns a pairing confirmation response. For example, the pairing confirmation request includes pairing information in which one side of pairing is the WWAN terminal 200 itself and the other side is the WLAN terminal 100. When the WLAN terminal 100 performs a pairing confirmation process, the wireless communication unit 210 transmits pairing information to the authentication server.

(2) Control Unit 240

The control unit 240 according to the present embodiment has a function of performing a pairing confirmation process. For example, the control unit 240 generates a pairing confirmation response indicating whether or not pairing with a wireless terminal indicated by the pairing confirmation request received by the wireless communication unit 210 has been established, and causes the wireless communication unit 210 to return the pairing confirmation response. In this way, when the WWAN terminal 200 performs a pairing confirmation process, processing load in the authentication server 340 is reduced. In addition, considering that the WLAN terminal 100 connects to the WLAN 500 using subscriber identification information of the WWAN terminal 200, when the pairing confirmation process is performed by the WWAN terminal 200, spoofing can be prevented. For example, the user of the WWAN terminal 200 can prevent spoofing by operating the WWAN terminal 200 such that it does not give the access right to an unknown wireless terminal.

The control unit 240 may generate the pairing confirmation response based on whether or not pairing with the wireless terminal indicated by the pairing confirmation request has been established in the past. In addition, the control unit 240 may generate the pairing confirmation response based on whether or not wireless connection with the wireless terminal indicated by the pairing confirmation request succeeds.

[3-3. Configuration Example of Authentication Server]

(1) Communication Unit 341

The communication unit 341 according to the present embodiment transmits a pairing confirmation request to a wireless terminal that performs a pairing confirmation process and receives a pairing confirmation response.

(2) Control Unit 343

The control unit 343 according to the present embodiment causes the WLAN terminal 100 or the WWAN terminal 200 to perform a pairing confirmation process. For example, the control unit 343 transmits a pairing confirmation request to at least either of the WLAN terminal 100 having succeeded in authentication to the WLAN 500 and the WWAN terminal 200 having subscriber identification information which has been used for authentication. For example, when pairing information is received by the communication unit 341, the control unit 343 may transmit a pairing confirmation request to a wireless terminal that is not a transmission source between wireless terminals indicated by the pairing information. In addition, the control unit 343 may transmit a pairing confirmation request to both the WLAN terminal 100 and the WWAN terminal 200 and cause the WLAN terminal 100 and the WWAN terminal 200 to perform a pairing confirmation process. In this case, the effect of preventing spoofing can be improved compared to the case of any one of the WLAN terminal 100 and the WWAN terminal 200 performing a pairing confirmation process.

The control unit 343 according to the present embodiment performs verification of the access right according to an access confirmation response from a wireless terminal that has performed a pairing confirmation process. For example, the control unit 343 gives the access right to the WLAN terminal 100 corresponding to an access confirmation response that pairing has been established.

A configuration example of the authentication server 340 according to the present embodiment has been described above.

[3-4. Operation Process]

Subsequently, an operation process of the wireless communication system 1 according to the present embodiment will be described. The example illustrated in FIG. 10 is an example of a connection process when the WLAN terminal 100 performs a pairing confirmation process, and the example illustrated in FIG. 11 is an example of a connection process when the WWAN terminal 200 performs a pairing confirmation process.

Figure 10:
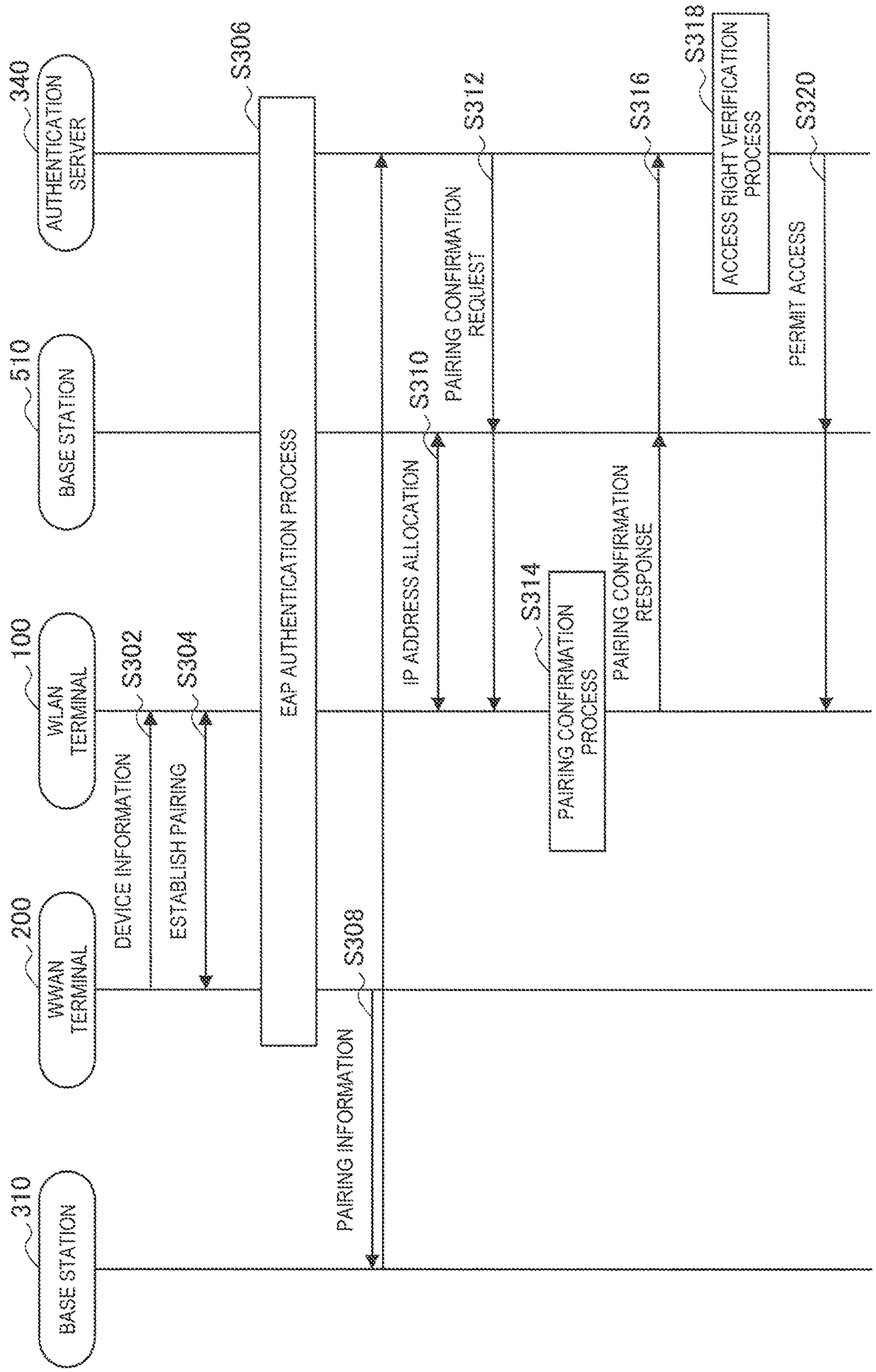
FIG. 10 is a sequence diagram illustrating an example of the flow of a connection process executed in a wireless communication system according to a second embodiment.
Figure 11:
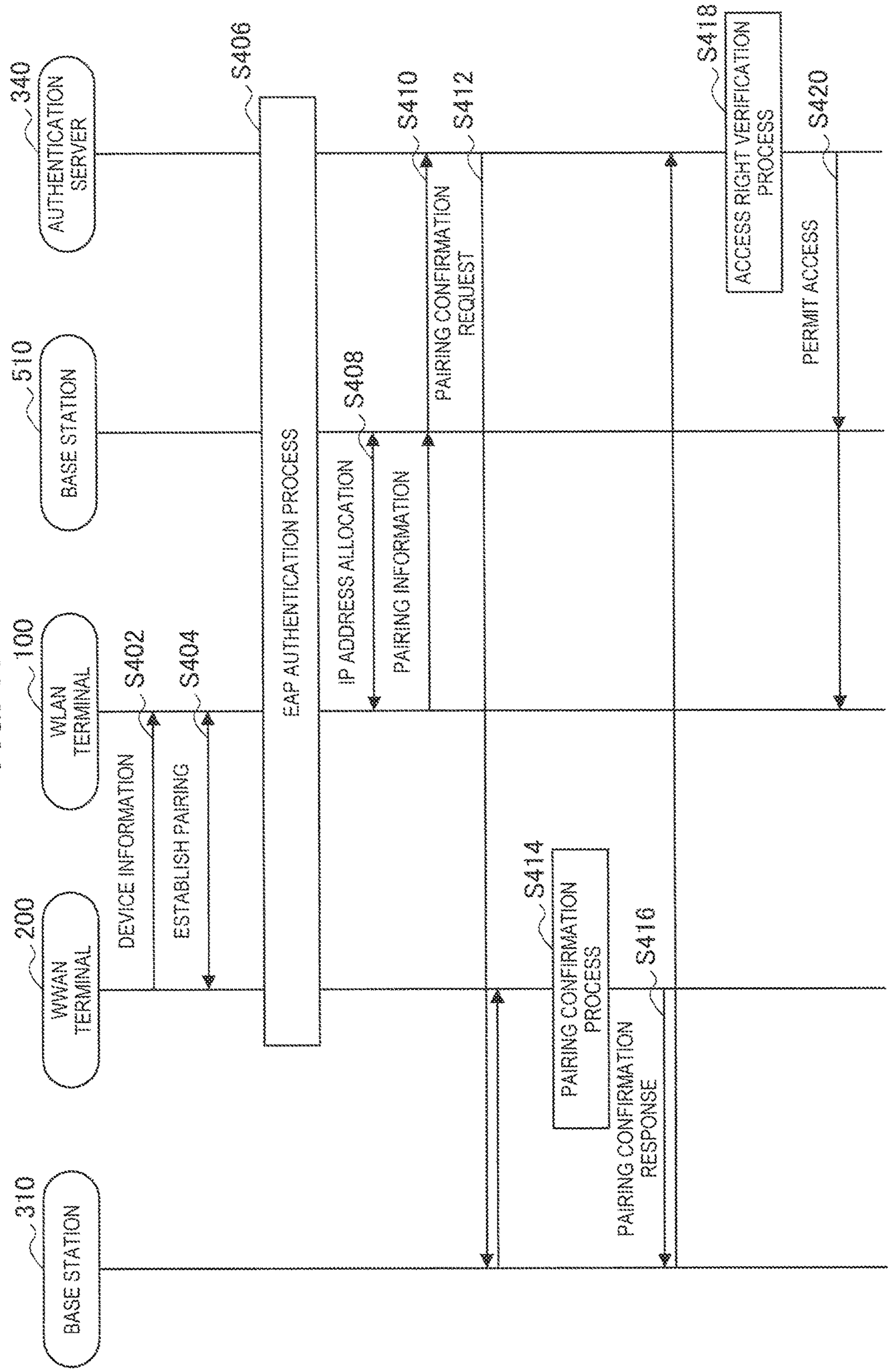
FIG. 11 is a sequence diagram illustrating an example of the flow of a connection process executed in a wireless communication system according to the second embodiment.

FIG. 10 is a sequence diagram illustrating an example of the flow of a connection process executed in the wireless communication system 1 according to the present embodiment. As illustrated in FIG. 10, the present sequence involves the base station 310, the WWAN terminal 200, the WLAN terminal 100, the base station 510, and the authentication server 340.

First, in step S302, the WWAN terminal 200 transmits device information to the WLAN terminal 100. Next, in step S304, the WLAN terminal 100 and the WWAN terminal 200 establish pairing. Next, in step S306, the WLAN terminal 100 performs authentication to the WLAN 500 by means of an EAP authentication process. Next, in step S308, the WWAN terminal 200 transmits pairing information to the authentication server 340 via the base station 310. The pairing information transmitted here includes identification information of the WWAN terminal 200 itself and the WLAN terminal 100 that is the pairing partner. Next, in step S310, the WLAN terminal 100 executes IP address allocation with the base station 510 to acquire an IP address.

Next, in step S312, the authentication server 340 transmits a pairing confirmation request to the WLAN terminal 100 via the base station 510. For example, the authentication server 340 transmits a pairing confirmation request to the WLAN terminal 100 that is a wireless terminal but is not a transmission source between wireless terminals indicated by the pairing information received in step S308 above. This pairing confirmation request includes the same pairing information including the identification information of the WLAN terminal 100 and the WWAN terminal 200 as the pairing information that has been received in step S308 above.

Next, in step S314, the WLAN terminal 100 performs a pairing confirmation process. For example, the WLAN terminal 100 confirms whether or not pairing with the WWAN terminal 200, which is a wireless terminal indicated by the pairing confirmation request received in step S312 above, has been established, and generates a pairing confirmation response indicating confirmation results. For example, the WLAN terminal 100 confirms whether or not the pairing has been established by referring to the memory unit 120 and attempting wireless connection with the WWAN terminal 200.

Next, in step S316, the WLAN terminal 100 transmits the pairing confirmation response generated in step S314 to the authentication server 340 via the base station 510.

Then, in step S318, the authentication server 340 performs a verification process of the access right. For example, based on the confirmation results indicated by the pairing confirmation response received in step S316 above, the authentication server 340 performs the verification process of the access right. For example, the authentication server 340 determines that the verification has succeeded when the confirmation results indicate success in the pairing confirmation, and determines that the verification has failed when the confirmation results indicate failure in the pairing confirmation.

In the case of success in the verification, in step S320, the authentication server 340 gives the access right to the WLAN terminal 100 and permits access. In the case of failure in the verification, the authentication server 340 does not give the access right to the WLAN terminal 100 and rejects use of the service network 400 by the WLAN terminal 100.

An example of a connection process according to the present embodiment has been described above. Subsequently, another example of a connection process will be described with reference to FIG. 11.

FIG. 11 is a sequence diagram illustrating an example of the flow of a connection process executed in the wireless communication system 1 according to the present embodiment. As illustrated in FIG. 11, the present sequence involves the base station 310, the WWAN terminal 200, the WLAN terminal 100, the base station 510, and the authentication server 340.

First, in step S402, the WWAN terminal 200 transmits device information to the WLAN terminal 100. Next, in step S404, the WLAN terminal 100 and the WWAN terminal 200 establish pairing. Next, in step S406, the WLAN terminal 100 performs authentication to the WLAN 500 by means of an EAP authentication process. Next, in step S408, the WLAN terminal 100 executes IP address allocation with the base station 510 to acquire an IP address. Next, in step S410, the WLAN terminal 100 transmits pairing information to the authentication server 340 via the base station 510. The pairing information transmitted here includes identification information of the WLAN terminal 100 itself and the WWAN terminal 200 that is the pairing partner.

Next, in step S412, the authentication server 340 transmits a pairing confirmation request to the WWAN terminal 200 via the base station 310. For example, the authentication server 340 transmits a pairing confirmation request to the WWAN terminal 200 that is a wireless terminal but is not a transmission source between wireless terminals indicated by the pairing information received in step S410 above. This pairing confirmation request includes the same pairing information including the identification information of the WLAN terminal 100 and the WWAN terminal 200 as the pairing information that has been received in step S410 above.

Next, in step S414, the WWAN terminal 200 performs a pairing confirmation process. For example, the WWAN terminal 200 confirms whether or not pairing with the WLAN terminal 100, which is a wireless terminal indicated by the pairing confirmation request received in step S412 above, has been established, and generates a pairing confirmation response indicating confirmation results. For example, the WWAN terminal 200 confirms whether or not the pairing has been established by referring to the memory unit 220 and attempting wireless connection with the WLAN terminal 100.

Next, in step S416, the WWAN terminal 200 transmits the pairing confirmation response generated in step S414 to the authentication server 340 via the base station 310.

Then, in step S418, the authentication server 340 performs a verification process of the access right.

In the case of success in the verification, in step S420, the authentication server 340 gives the access right to the WLAN terminal 100 and permits access. In the case of failure in the verification, the authentication server 340 does not give the access right to the WLAN terminal 100 and rejects use of the service network 400 by the WLAN terminal 100.

(3) Supplement

The wireless communication system 1 according to the present embodiment may be combined with the examples of a connection process illustrated in FIG. 10 and FIG. 11. For example, the authentication server 340 may transmit an access confirmation request to both the WLAN terminal 100 and the WWAN terminal 200 and perform a verification process of the access right based on access confirmation responses of both.

4. THIRD EMBODIMENT

The present embodiment is a form in which a payment terminal is involved in a process for the WLAN terminal 100 to connect to the WLAN 500. First, an overview of a wireless communication system 1 according to the present embodiment will be described with reference to FIG. 12.

[4-1. Overview]

Figure 12:
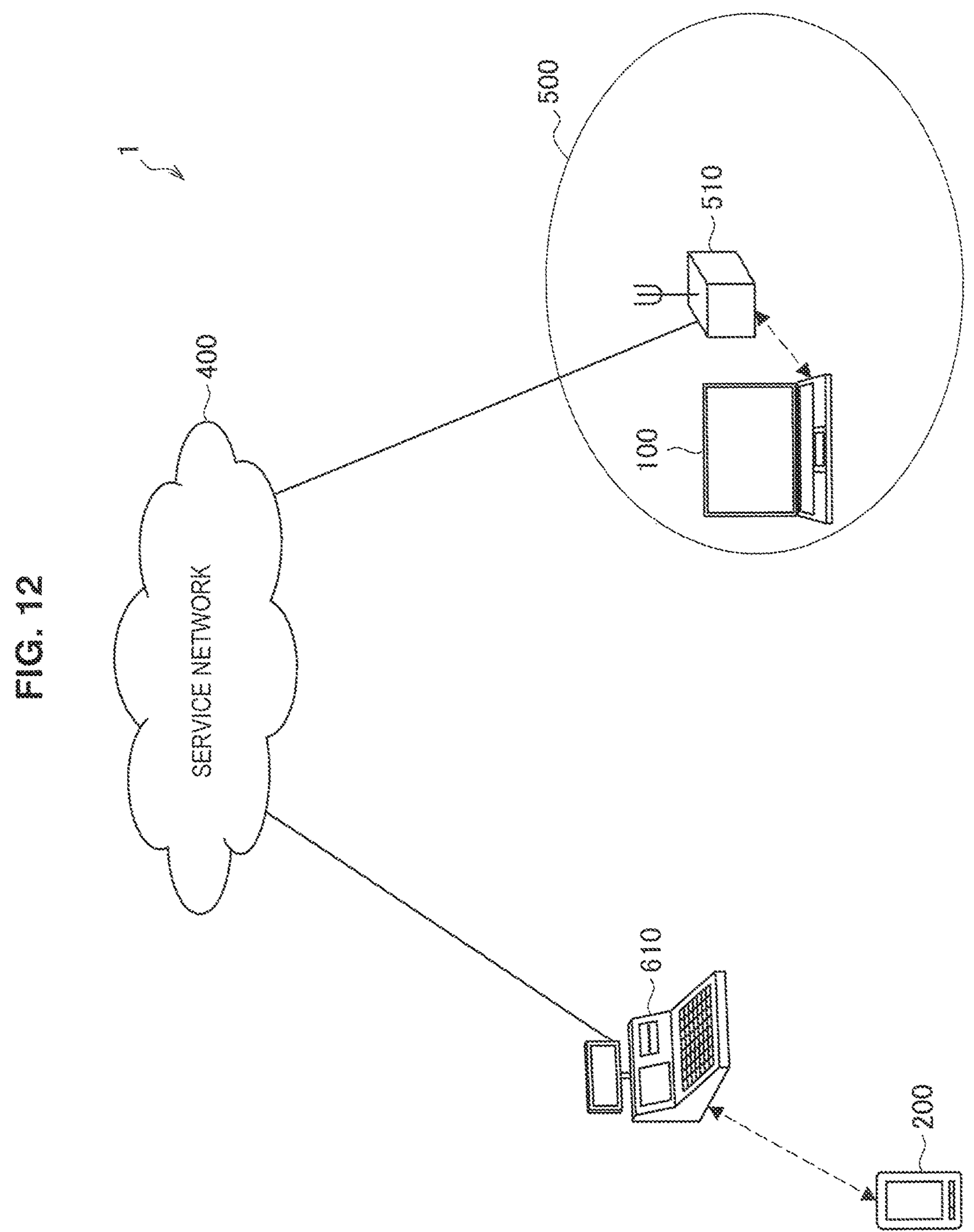
FIG. 12 is a view for explaining an overview of a wireless communication system according to the present embodiment.

FIG. 12 is a view for explaining an overview of the wireless communication system 1 according to the present embodiment. As illustrated in FIG. 12, compared to the example illustrated in FIG. 2, the wireless communication system 1 according to the present embodiment is different in that a payment terminal 610 is included.

The payment terminal 610 is a payment apparatus that has a function of making various payments. Typically, the payment terminal 610 performs near field wireless communication with a smartphone or the like to make an electronic payment. The payment terminal 610 may perform a payment process using its own payment function, or may perform a payment process via communication with another apparatus having a payment function (for example, a payment server 360 which will be described below).

The payment terminal 610 according to the present embodiment performs communication with the WWAN terminal 200 and performs a payment process according to a payment request from the WWAN terminal 200. For example, the payment terminal 610 performs a payment process for removing limitations on communication of the WLAN terminal 100 with the WLAN 500 according to a payment request from the WWAN terminal 200. Typically, this payment process is a payment procedure for a HotSpot connection charge and the like. In the present embodiment, when the WLAN terminal 100 connects to the WLAN 500 that requires payment of a connection charge and the like, payment using the WWAN terminal 200 is enabled, and thus user convenience is improved.

In addition, the payment terminal 610 according to the present embodiment may control transmission of pairing information of the WWAN terminal 200 to the authentication server 340 according to the success or failure of a payment process. For example, the payment terminal 610 may receive pairing information from the WWAN terminal 200 by means of near field communication or the like, and transmit the pairing information to the authentication server 340 when a payment process has succeeded. In this case, transmission of the pairing information to the authentication server 340 is performed by the payment terminal 610 instead of the WWAN terminal 200. This allows the WWAN terminal 200 to omit a process of transmitting the pairing information using a WWAN communication function and to consume less power. Further, the WWAN terminal 200 may not have the WWAN communication function, and in this case, the WWAN terminal 200 is provided to a user at a lower cost. Besides, when the payment process has succeeded, the payment terminal 610 may permit the WWAN terminal 200 to transmit the pairing information to the authentication server 340. When the payment terminal 610 controls transmission of pairing information according to the success or failure of a payment process, a target from which communication limitations are removed becomes the WLAN terminal 100 which has been paired with the WWAN terminal 200 having succeeded in the payment process, and thus safety is further improved.

An overview of the wireless communication system 1 according to the present embodiment has been described above. The wireless communication system 1 according to the present embodiment has the same function and structure as the wireless communication system 1 according to each embodiment described above. Distinguishing configurations of the wireless communication system 1 according to the present embodiment will be described below. First, an overall configuration example of the wireless communication system 1 according to the present embodiment will be described.

[4-2. Configuration Example of Wireless Communication System]

Figure 13:
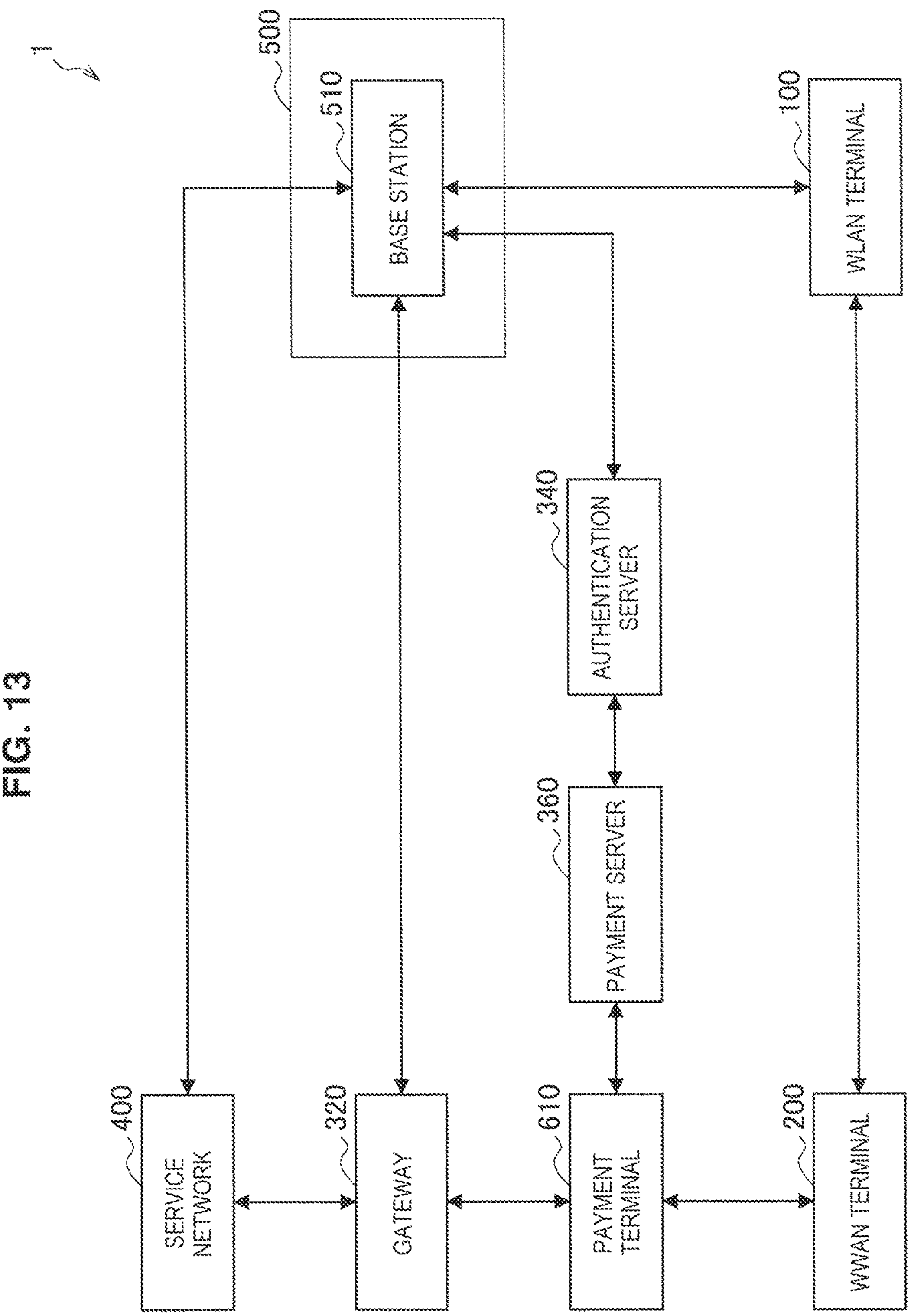
FIG. 13 is a block diagram illustrating an example of a configuration of a wireless communication system according to the present embodiment.

FIG. 13 is a block diagram illustrating an example of a configuration of the wireless communication system 1 according to the present embodiment. In the configuration example illustrated in FIG. 13, structural elements illustrated in FIG. 3 are omitted except structural elements involved in the present embodiment, and new structural elements are added. As illustrated in FIG. 12, the wireless communication system 1 according to the present embodiment has the payment server 360 and the payment terminal 610 as new structural elements.

The payment server 360 performs a payment process with the WWAN terminal 200 via the payment terminal 610. The payment server 360 establishes an encrypted communication path with the WWAN terminal 200 via the payment terminal 610 and then performs a payment process. The payment server 360 may perform a payment process using subscriber identification information of the WWAN terminal 200, or may perform an authentication process and a payment process associated with the payment server 360.

Subsequently, distinguishing configurations of the present embodiment relating to the WWAN terminal 200 will be described, and also a configuration example of the payment terminal 610 according to the present embodiment will be described with reference to FIG. 14.

[4-3. Configuration Example of WWAN Terminal]

(1) Wireless Communication Unit 210

The wireless communication unit 210 according to the present embodiment serves as a second wireless communication unit that transmits and receives various information for removing limitations on communication of the WLAN terminal 100 with the WLAN 500 to/from the payment terminal 610. For example, the wireless communication unit 210 transmits a payment request to the payment terminal 610. In addition, the wireless communication unit 210 transmits pairing information to the payment terminal 610. In transmission of these pieces of information, a near field wireless communication scheme, such as NFC, Bluetooth, Bluetooth low energy, Wi-Fi direct, WLAN, ZigBee, IrDA, or the like, may be used.

(2) Control Unit 240

The control unit 240 according to the present embodiment has a function of controlling communication with the payment terminal 610 for removing limitations on communication of the WLAN terminal 100 with the WLAN 500. For example, the control unit 240 controls the wireless communication unit 210 to transmit a payment request to the payment terminal 610. This allows the payment terminal 610 to perform a payment process for removing limitations on communication of the WLAN terminal 100 with the WLAN 500. The payment request includes information for a payment process, for example, the amount of payment, a payment destination, and the like. In addition, the control unit 240 may control the wireless communication unit 210 to transmit pairing information. Accordingly, when the payment process succeeds, pairing information is transmitted to the authentication server 340 via the payment terminal 610. Therefore, when a user finishes payment using the WWAN terminal 200, communication limitations on the WLAN terminal 100 are removed, and thus user convenience is improved.

[4-4. Configuration Example of Payment Terminal]

Figure 14:
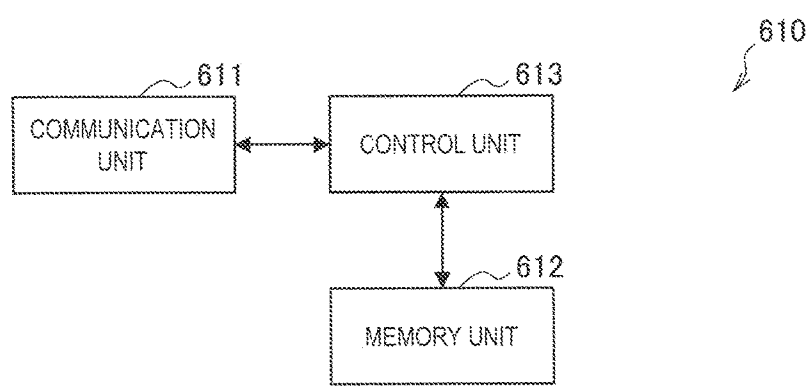
FIG. 14 is a block diagram illustrating an example of a logical configuration of a payment terminal according to the present embodiment.

FIG. 14 is a block diagram illustrating an example of a logical configuration of the payment terminal 610 according to the present embodiment. As illustrated in FIG. 14, the payment terminal 610 has a communication unit 611, a memory unit 612, and a control unit 613.

(1) Communication Unit 611

The communication unit 611 is a communication module that transmits and receives data to/from an external device. The communication unit 611 can perform wireless communication using various wired/wireless communication schemes. The communication unit 611 according to the present embodiment serves as a first communication unit that communicates with the WWAN terminal 200 having identification information of subscribers to the WWAN 300. For example, the communication unit 611 receives a payment request and pairing information from the WWAN terminal 200. In addition, the communication unit 611 according to the present embodiment serves as a second communication unit that communicates with the authentication server 340 determining whether or not to remove limitations on communication of the WLAN terminal 100 with the WLAN 500. For example, when a payment process succeeds, the communication unit 611 transmits pairing information to the authentication server 340.

(2) Memory Unit 612

The memory unit 612 is a portion that performs recording and reproduction of data on a predetermined recording medium. For example, the memory unit 612 stores information received from the WWAN terminal 200 by the communication unit 611. Specifically, the memory unit 612 stores pairing information received from the WWAN terminal 200. The memory unit 612 may store the received pairing information until the payment process succeeds and destroy the stored pairing information after the payment process succeeds and then the stored pairing information is transmitted to the authentication server 340.

(3) Control Unit 613

The control unit 613 serves as an arithmetic processor and a controller, and controls the overall operation in the payment terminal 610 according to various programs.

For example, the control unit 613 has a function of performing the payment process based on the payment request received from the WWAN terminal 200 by the communication unit 611. The payment terminal 610 may perform the payment process using its own payment function, or may perform the payment process via communication with the payment server 360 having a payment function.

In addition, the control unit 613 has a function of controlling the communication unit 611 to transmit the pairing information received from the WWAN terminal 200 by the communication unit 611 to the authentication server 340. For example, the control unit 613 may control the communication unit 611 to transmit the pairing information to the authentication server 340 when the payment process succeeds and not to transmit the pairing information when the payment process fails. In this case, a target from which communication limitations are removed by the authentication server 340 becomes the WLAN terminal 100 which has been paired with the WWAN terminal 200 having succeeded in the payment process, and thus safety is further improved.

A configuration example of the wireless communication system 1 has been described above. Subsequently, an operation process of the wireless communication system 1 according to the present embodiment will be described with reference to FIG. 15.

[4-5. Operation Process]

Figure 15:
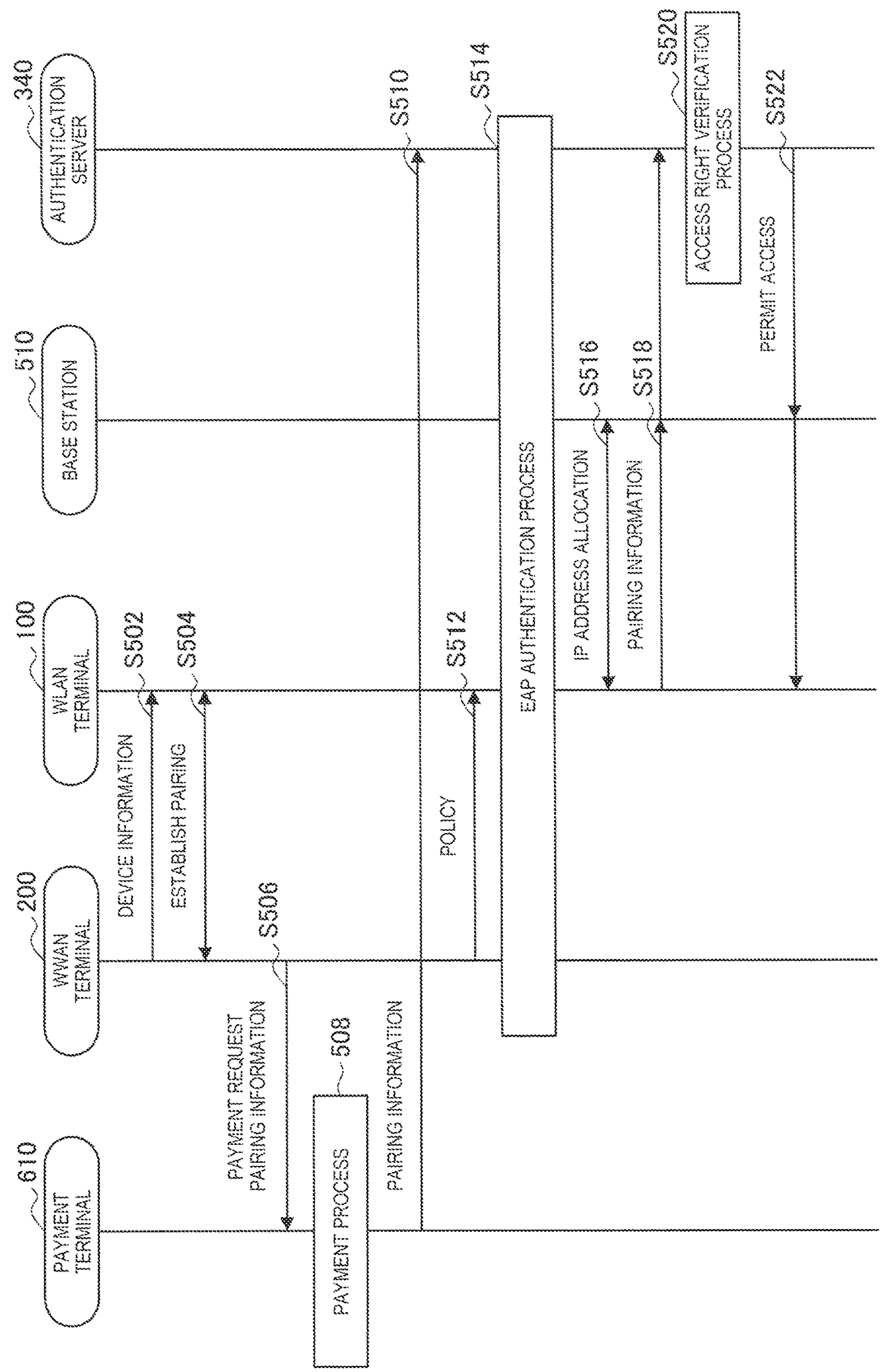
FIG. 15 is a sequence diagram illustrating an example of the flow of a connection process executed in a wireless communication system according to the present embodiment.

FIG. 15 is a sequence diagram illustrating an example of the flow of a connection process executed in the wireless communication system 1 according to the present embodiment. As illustrated in FIG. 15, the present sequence involves the payment terminal 610, the WWAN terminal 200, the WLAN terminal 100, the base station 510, and the authentication server 340.

First, in step S502, the WWAN terminal 200 transmits device information to the WLAN terminal 100. Next, in step S504, the WLAN terminal 100 and the WWAN terminal 200 establish pairing.

Next, in step S506, the WWAN terminal 200 transmits a payment request and pairing information to the payment terminal 610. The WWAN terminal 200 may transmit the payment request first, and transmit the pairing information after a payment process of the payment terminal 610 succeeds.

Next, in step S508, the payment terminal 610 performs a payment process. For example, the payment terminal 610 performs a payment process via communication with the payment server 360. An operation in the case where the payment process has succeeded will be described below.

Next, in step S510, the payment terminal 610 transmits the pairing information which has been received from the WWAN terminal 200 in step S506 above to the authentication server 340.

Next, in step S512, the WWAN terminal 200 transmits a policy to the WLAN terminal 100. The policy can at least include access information and information indicating an order of priority regarding the base station 510.

Next, in step S514, the WLAN terminal 100 performs authentication to the WLAN 500 by means of an EAP authentication process.

Next, in step S516, the WLAN terminal 100 executes IP address allocation with the base station 510 to acquire an IP address.

Next, in step S518, the WLAN terminal 100 transmits pairing information to the authentication server 340 via the base station 510.

Then, in step S520, the authentication server 340 performs a verification process of the access right.

In the case of success in the verification, in step S522, the authentication server 340 gives the access right to the WLAN terminal 100 and permits access. In the case of failure in the verification, the authentication server 340 does not give the access right to the WLAN terminal 100 and rejects use of the service network 400 by the WLAN terminal 100.

An example of a connection process according to the present embodiment has been described above.

The WWAN terminal 200 may transmit the pairing information to the authentication server 340 not via the payment terminal 610. In this case, for example, the WWAN terminal 200 omits transmission of the pairing information in step S506. Then, in step S510, the WWAN terminal 200 may transmit the pairing information to the authentication server 340 via the base station 310 as a result of success in the payment process in step S508 above. In this case, the pairing information does not go through the payment terminal 610, and thus safety is further improved.

5. APPLICATION EXAMPLES

The technology of the present disclosure can be applied to various products. For example, the wireless communication apparatus 100 and the wireless communication apparatus 200 may be implemented as a mobile terminal such as a smartphone, a tablet-type personal computer (PC), a notebook PC, a portable game terminal, or a digital camera, a fixed-type terminal such as a television receiver set, a printer, a digital scanner, or a network storage, or an in-vehicle terminal such as a car navigation apparatus. In addition, the wireless communication apparatus 100 and the wireless communication apparatus 200 may be implemented as a terminal which performs machine-to-machine (M2M) communication (which is also referred to as a machine-type communication (MTC) terminal) such as a smart meter, a vending machine, a remote monitoring apparatus, or a point-of-sale (POS) terminal. Furthermore, the wireless communication apparatus 100 and the wireless communication apparatus 200 may be a wireless communication module (for example, an integrated circuit module configured in one die) mounted in these terminals.

5-1. First Application Example

Figure 16:
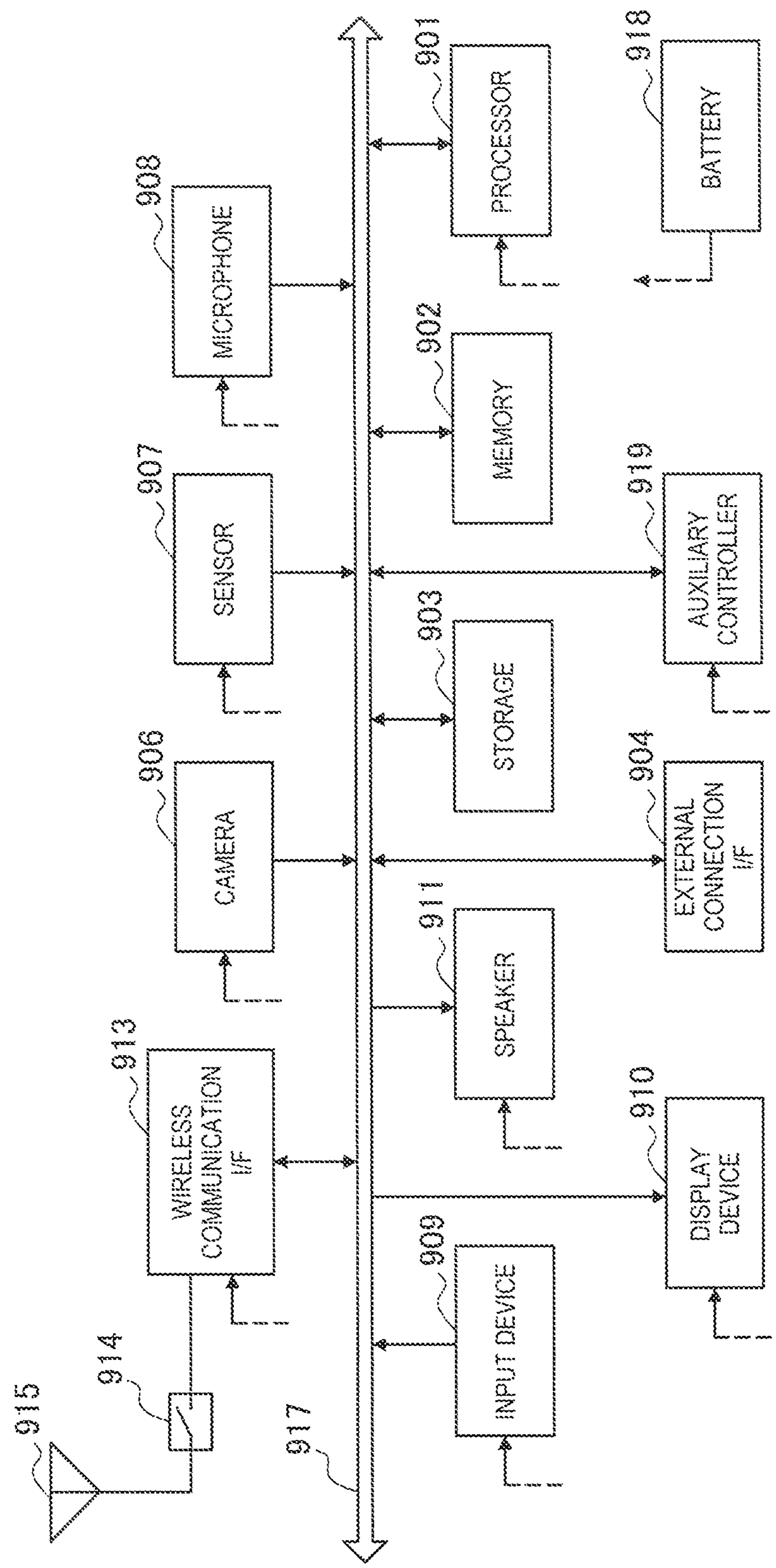
FIG. 16 is a block diagram illustrating an example of a schematic configuration of a smartphone.

FIG. 16 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on a chip (SoC), and controls functions of an application layer and another layer of the smartphone 900. The memory 902 includes a random access memory (RAM) and a read only memory (ROM), and stores a program that is executed by the processor 901, and data. The storage 903 may include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user.

The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 913 supports one or more of wireless LAN standards such as IEEE 802.11a, 11b, 11g, 11n, 11ac, and 11ad to execute wireless communication. The wireless communication interface 913 can communicate with another apparatus via a wireless LAN access point in an infrastructure mode. In addition, the wireless communication interface 913 can directly communicate with another apparatus in an ad hoc mode or a direct communication mode such as Wi-Fi direct (registered trademark), or the like. In the Wi-Fi Direct, unlike the ad-hoc mode, one of two terminals operates as an access point, but communication is performed directly between the terminals. The wireless communication interface 913 can typically include a baseband processor, a radio frequency (RF) circuit, and a power amplifier. The wireless communication interface 913 may be a one-chip module in which a memory which stores a communication control program, a processor which executes the program and a relevant circuit are integrated. The wireless communication interface 913 may support other kinds of wireless communication schemes such as a near field wireless communication scheme, a proximity wireless communication scheme or a cellular communication scheme in addition to the wireless LAN scheme. The antenna switch 914 switches connection destinations of the antenna 915 between a plurality of circuits (for example, circuits for different wireless communication schemes) included in the wireless communication interface 913. The antenna 915 has a single or a plurality of antenna elements (for example, a plurality of antenna elements which constitute a MIMO antenna), which are used by the wireless communication interface 913 for transmission and reception of radio signals.

It should be noted that the smartphone 900 is not limited to the example of FIG. 16 and may include a plurality of antennas (for example, an antenna for a wireless LAN, or an antenna for the proximity wireless communication scheme, etc.). In that case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to blocks of the smartphone 900 illustrated in FIG. 16 via feeder lines, which are partially shown as dashed lines in the figure. The auxiliary controller 919 operates a minimum necessary function of the smartphone 900, for example, in a sleep mode.

The smartphone 900 illustrated in FIG. 16 may operate as the wireless communication apparatus 100. In that case, for example, the wireless communication unit 110, the memory unit 120, and the control unit 130 described with reference to FIG. 4 may be implemented by the wireless communication interface 913. In addition, at least some of these functions may be implemented by the processor 901 or the auxiliary controller 919.

The smartphone 900 illustrated in FIG. 16 may operate as the wireless communication apparatus 200. In that case, for example, the wireless communication unit 210, the memory unit 220, the subscriber identification module 230, and the control unit 240 described with reference to FIG. 5 may be implemented by the wireless communication interface 913. In addition, at least some of these functions may be implemented by the processor 901 or the auxiliary controller 919.

The smartphone 900 may operate as a wireless access point (software AP) by executing an access point function at an application level through the processor 901. Further, the wireless communication interface 913 may have a wireless access point function.

5-2. Second Application Example

Figure 17:
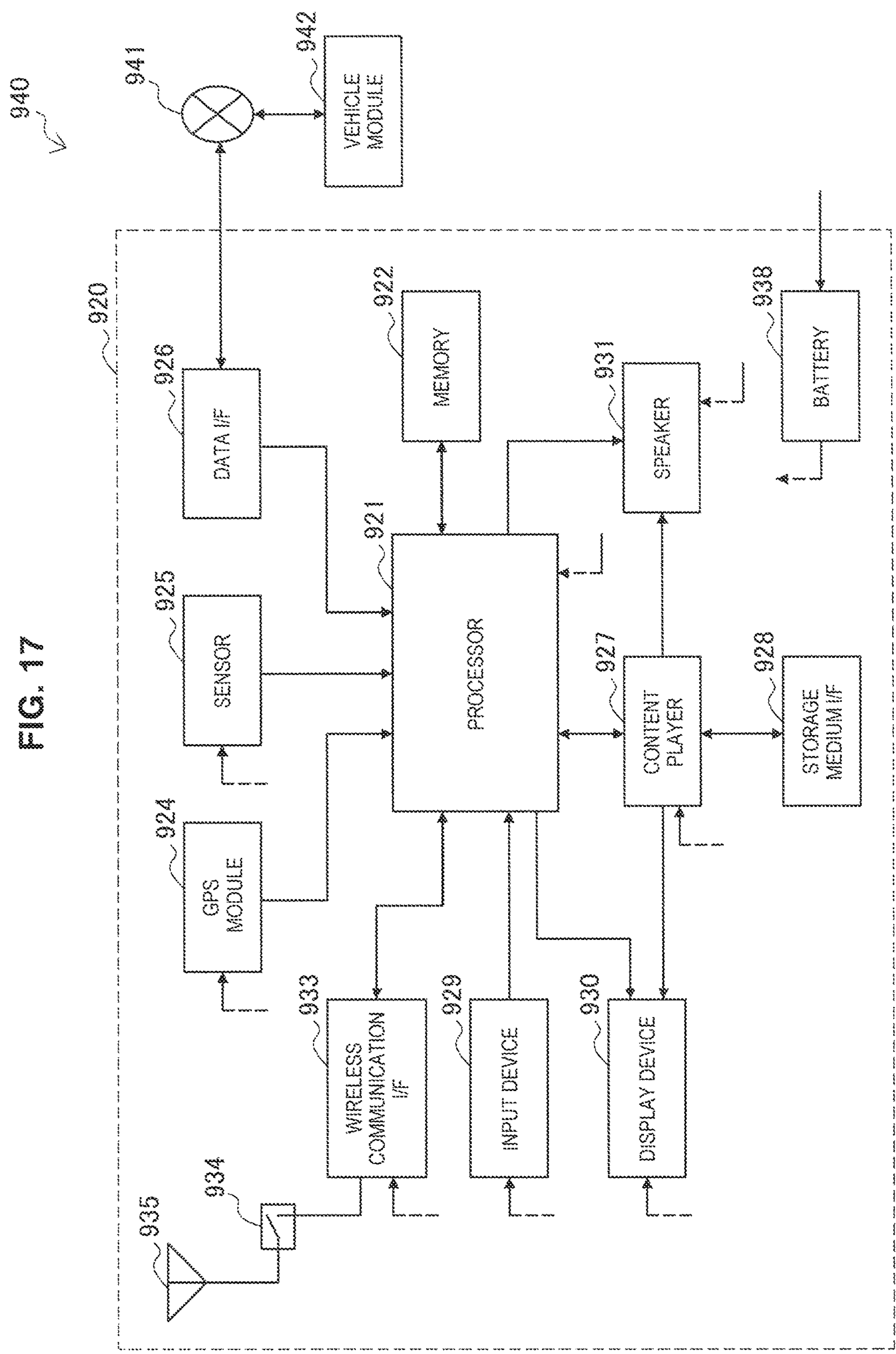
FIG. 17 is a block diagram illustrating an example of a schematic configuration of a car navigation apparatus.

FIG. 17 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports one or more of wireless LAN standards such as IEEE 802.11a, 11b, 11g, 11n, 11ac, and 11ad to execute wireless communication. The wireless communication interface 933 can communicate with another apparatus via a wireless LAN access point in an infrastructure mode. In addition, the wireless communication interface 933 can directly communicate with another apparatus in an ad hoc mode or a direct communication mode such as Wi-Fi Direct. The wireless communication interface 933 can typically include a baseband processor, an RF circuit, and a power amplifier. The wireless communication interface 933 may be a one-chip module in which a memory which stores a communication control program, a processor which executes the program and a relevant circuit are integrated. The wireless communication interface 933 may support other kinds of wireless communication schemes such as a near field wireless communication scheme, a proximity wireless communication scheme or a cellular communication scheme in addition to the wireless LAN scheme. The antenna switch 934 switches connection destinations of the antenna 935 between a plurality of circuits included in the wireless communication interface 933. The antenna 935 has a single or a plurality of antenna elements, which are used by the wireless communication interface 933 for transmission and reception of radio signals.

In addition, the car navigation apparatus 920 may include a plurality of antennas, not limited to the example of FIG. 17. In that case, the antenna switches 934 may be omitted from the configuration of the car navigation apparatus 920.

The battery 938 supplies power to blocks of the car navigation apparatus 920 illustrated in FIG. 17 via feeder lines that are partially shown as dashed lines in the figure. The battery 938 accumulates power supplied form the vehicle.

The car navigation apparatus 920 illustrated in FIG. 17 may operate as the wireless communication apparatus 100. In that case, for example, the wireless communication unit 110, the memory unit 120, and the control unit 130 described with reference to FIG. 4 may be implemented by the wireless communication interface 933. In addition, at least some of these functions may be implemented by the processor 921.

The car navigation apparatus 920 illustrated in FIG. 17 may operate as the wireless communication apparatus 200. In that case, for example, the wireless communication unit 210, the memory unit 220, the subscriber identification module 230, and the control unit 240 described with reference to FIG. 5 may be implemented by the wireless communication interface 933. In addition, at least some of these functions may be implemented by the processor 921.

The technology of the present disclosure may also be implemented as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

6. CONCLUSION

Thus far, technical embodiments according to the present disclosure have been described in detail using FIG. 1 to FIG. 17. According to the embodiments described above, with regard to the WLAN terminal 100 that performs wireless communication with the WWAN terminal 200 connecting to the WWAN 300 to perform wireless communication and connects to the WLAN 500 to perform wireless communication, information on pairing with the WWAN terminal 200 is transmitted to remove limitations on communication with the WLAN 500. Since verification of the access right is performed based on pairing information transmitted from the WWAN terminal 200, spoofing is more reliably prevented compared to the case of simply managing the access right using a MAC address. For example, a communication service provider becomes able to specify subscriber identification information of the WWAN terminal 200 paired with the WLAN terminal 100 using the pairing information, and can reduce the risk of spoofing. This allows the WLAN terminal 100 to connect to the Internet more safely. In addition, since the communication service provider can specify a relationship between the WWAN terminal 200 and the WLAN terminal 100 by means of pairing information, it becomes possible to readily perform access management, limitation of the number of terminals, billing management, and the like, and to provide a precise service.

In addition, based on whether or not pairing information coincident with pairing information transmitted by the WLAN terminal 100 has been transmitted from the WWAN terminal 200, verification of the access right (determination of removal of communication limitations) is performed. Since the communication limitations are removed when the pieces of pairing information transmitted from both the WLAN terminal 100 and the WWAN terminal 200 coincide, spoofing is more reliably prevented compared to a case where the verification is performed based on information from one side.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the embodiments described above, it has been described that the authentication server 340 performs verification of the access right, but the present technology is not limited to the corresponding examples. For example, the verification of the access right can be performed by an arbitrary apparatus managed by a communication service provider.

The series of processes carried out by each apparatus described in the present specification may be implemented by software, hardware, or a combination of software and hardware. Programs that compose such software may be stored in advance for example on a storage medium (non-transitory medium) provided inside or outside each apparatus. As one example, during execution by a computer, such programs are written into a RAM (Random Access Memory) and executed by a processor such as a CPU.

Note that it is not necessary for the processes described in this specification with reference to the flowchart and the sequence diagrams to be executed in the order shown in the flowchart and the sequence diagrams. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A wireless communication apparatus including:

a first wireless communication unit configured to perform pairing and wireless communication with a wireless terminal that connects to a first network and performs wireless communication;

a second wireless communication unit configured to connect to a second network and perform wireless communication; and a control unit configured to control the second wireless communication unit to transmit information on pairing with the wireless terminal in order to remove limitations on communication with the second network.

(2)

The wireless communication apparatus according to (1), wherein a determination of removal of the communication limitations is made based on whether or not pairing information coincident with the pairing information transmitted by the second wireless communication unit has been transmitted from the wireless terminal.

(3)

The wireless communication apparatus according to (2), wherein communication for the determination of removal of the communication limitations is permitted in an environment having the communication limitations.

(4)

The wireless communication apparatus according to any one of (1) to (3), wherein the pairing information includes at least one of identification information for identifying the wireless terminal with which the pairing has been established and identification information for identifying the wireless communication apparatus, a link key generated when the pairing is established, and hash data generated based on the link key.

(5)

The wireless communication apparatus according to (4), wherein the identification information is device address information used in the wireless communication between the wireless terminal and the first wireless communication unit.

(6)

The wireless communication apparatus according to any one of (1) to (5), wherein the control unit performs authentication to the second network by means of extensible authentication protocol (EAP) authentication using subscriber identification information of the wireless terminal.

(7)

The wireless communication apparatus according to (6), further including:

a memory unit configured to store the information on pairing with a wireless terminal with which pairing has been established in past, wherein the control unit selects the information on pairing with the wireless terminal, which has the subscriber identification information used for the EAP authentication, from the memory unit as a target of transmission by the second wireless communication unit.

(8)

The wireless communication apparatus according to any one of (1) to (7), wherein the control unit encrypts the pairing information.

(9)

The wireless communication apparatus according to any one of (1) to (8), wherein the control unit controls the second wireless communication unit to transmit type information indicating a type of the wireless communication apparatus.

(10)

The wireless communication apparatus according to any one of (1) to (9), wherein the control unit generates response information indicating whether or not pairing with a wireless terminal indicated by a confirmation request received by the second wireless communication unit has been established and causes the second wireless communication unit to return the response information.

(11)

The wireless communication apparatus according to (10), wherein the control unit generates the response information based on whether or not wireless connection with the wireless terminal indicated by the confirmation request succeeds.

(12)

The wireless communication apparatus according to any one of (1) to (11), wherein the first network is a mobile communication network.

(13)

The wireless communication apparatus according to any one of (1) to (12), wherein the second network is a public wireless LAN.

(14)

A wireless communication apparatus including:

a first wireless communication unit configured to connect to a first network and perform wireless communication;

a second wireless communication unit configured to perform pairing and wireless communication with a wireless terminal that connects to a second network and performs wireless communication; and a control unit configured to control the first wireless communication unit to transmit information on pairing with the wireless terminal in order to remove limitations on communication of the wireless terminal with the second network.

(15)

The wireless communication apparatus according to (14), further including:

a storage unit configured to store identification information of subscribers to the first network, wherein the control unit controls the first wireless communication unit to transmit the pairing information when EAP authentication to the second network by the wireless terminal using the subscriber identification information stored in the storage unit succeeds.

(16)

The wireless communication apparatus according to (14) or (15), wherein the control unit controls the second wireless communication unit to transmit a payment request to a payment apparatus in order to remove the limitations on communication of the wireless terminal with the second network.

(17)

The wireless communication apparatus according to (16), wherein the control unit controls the second wireless communication unit to transmit the pairing information to the payment apparatus in order to remove the limitations on communication of the wireless terminal with the second network.

(18)

A server including:

a communication unit configured to perform communication with a first wireless terminal that connects to a first network and performs wireless communication and a second wireless terminal that connects to a second network and performs wireless communication; and a control unit configured to determine whether or not to remove limitations on communication of the second wireless terminal with the second network based on whether or not first pairing information received from the first wireless terminal by the communication unit and second pairing information received from the second wireless terminal by the communication unit coincide.

(19)

A payment apparatus including:

a first communication unit configured to perform communication with a first wireless terminal having identification information of subscribers to a first network;

a second communication unit configured to perform communication with a server that determines whether or not to remove limitations on communication of a second wireless terminal with a second network; and a control unit configured to perform a payment process based on a payment request received by the first communication unit, wherein the control unit controls the second communication unit to transmit pairing information received by the first communication unit to the server.

(20)

A wireless communication method including:

performing, by a first wireless communication unit, pairing and wireless communication with a wireless terminal that connects to a first network and performs wireless communication;

connecting, by a second wireless communication unit, to a second network and performing wireless communication; and controlling the second wireless communication unit to transmit information on pairing with the wireless terminal in order to remove limitations on communication with the second network.

(21)

A wireless communication method including:

connecting, by a first wireless communication unit, to a first network and performing wireless communication;

performing, by a second wireless communication unit, pairing and wireless communication with a wireless terminal that connects to a second network and performs wireless communication; and controlling the first wireless communication unit to transmit information on pairing with the wireless terminal in order to remove limitations on communication of the wireless terminal with the second network.

(22)

A program for causing a computer to serve as:

a first wireless communication unit configured to perform pairing and wireless communication with a wireless terminal that connects to a first network and performs wireless communication;

a second wireless communication unit configured to connect to a second network and perform wireless communication; and a control unit configured to control the second wireless communication unit to transmit information on pairing with the wireless terminal in order to remove limitations on communication with the second network.

(23)

A program for causing a computer to serve as:

a first wireless communication unit configured to connect to a first network and perform wireless communication;

a second wireless communication unit configured to perform pairing and wireless communication with a wireless terminal that connects to a second network and performs wireless communication; and a control unit configured to control the first wireless communication unit to transmit information on pairing with the wireless terminal in order to remove limitations on communication of the wireless terminal with the second network.

REFERENCE SIGNS LIST

1 wireless communication system
100 WLAN terminal
110 wireless communication unit
112 WLAN module
114 BT module
116 NFC module
120 memory unit
130 control unit
200 WWAN terminal
210 wireless communication unit
212 WWAN module
214 WLAN module
216 BT module
218 NFC module
220 memory unit
230 subscriber identification module
240 control unit
300 WWAN
310 base station
320 gateway
330 subscriber information server
340 authentication server
341 communication unit
342 memory unit
343 control unit
350 network information providing server
360 payment server
400 service network
500 WLAN
510 base station
610 payment terminal
611 communication unit
612 memory unit
613 control unit

The invention claimed is:

1. A wireless communication apparatus comprising:

first wireless communication circuitry configured to perform pairing and wireless communication with a wireless terminal that connects to a first network and performs wireless communication;

second wireless communication circuitry configured to connect to a second network and perform wireless communication; and control circuitry configured to control the second wireless communication unit to transmit information on pairing with the wireless terminal in order to remove limitations on communication with the second network;

wherein the control circuitry performs authentication to the second network by means of extensible authentication protocol (EAP) authentication using subscriber identification information of the wireless terminal;

a memory circuitry configured to store the information on pairing with a wireless terminal with which pairing has been established in past, wherein the control circuitry selects the information on pairing with the wireless terminal, which has the subscriber identification information used for the EAP authentication, from the memory circuitry as a target of transmission by the second wireless communication circuitry.

2. The wireless communication apparatus according to claim 1, wherein a determination of removal of the communication limitations is made based on whether or not pairing information coincident with the pairing information transmitted by the second wireless communication circuitry has been transmitted from the wireless terminal.

3. The wireless communication apparatus according to claim 2, wherein communication for the determination of removal of the communication limitations is permitted in an environment having the communication limitations.

4. The wireless communication apparatus according to claim 1, wherein the pairing information includes at least one of identification information for identifying the wireless terminal with which the pairing has been established and identification information for identifying the wireless communication apparatus, a link key generated when the pairing is established, and hash data generated based on the link key.

5. The wireless communication apparatus according to claim 4, wherein the identification information is device address information used in the wireless communication between the wireless terminal and the first wireless communication circuitry.

6. The wireless communication apparatus according to claim 1, wherein the control circuitry encrypts the pairing information.

7. The wireless communication apparatus according to claim 1, wherein the control circuitry controls the second wireless communication circuitry to transmit type information indicating a type of the wireless communication apparatus.

8. The wireless communication apparatus according to claim 1, wherein the control circuitry generates response information indicating whether or not pairing with a wireless terminal indicated by a confirmation request received by the second wireless communication circuitry has been established and causes the second wireless communication circuitry to return the response information.

9. The wireless communication apparatus according to claim 8, wherein the control circuitry generates the response information based on whether or not wireless connection with the wireless terminal indicated by the confirmation request succeeds.

10. The wireless communication apparatus according to claim 1, wherein the first network is a mobile communication network.

11. The wireless communication apparatus according to claim 1, wherein the second network is a public wireless LAN.

12. A wireless communication apparatus comprising:

first wireless communication circuitry configured to connect to a first network and perform wireless communication;

second wireless communication circuitry configured to perform pairing and wireless communication with a wireless terminal that connects to a second network and performs wireless communication; and control circuitry configured to control the first wireless communication unit to transmit information on pairing with the wireless terminal in order to remove limitations on communication of the wireless terminal with the second network;

wherein the control circuitry performs authentication to the second network by means of extensible authentication protocol (EAP) authentication using subscriber identification information of the wireless terminal;

a memory circuitry configured to store the information on pairing with a wireless terminal with which pairing has been established in past, wherein the control circuitry selects the information on pairing with the wireless terminal, which has the subscriber identification information used for the EAP authentication, from the memory circuitry as a target of transmission by the second wireless communication circuitry.

13. The wireless communication apparatus according to claim 12, further comprising:

a storage circuitry configured to store identification information of subscribers to the first network, wherein the control circuitry controls the first wireless communication circuitry to transmit the pairing information when EAP authentication to the second network by the wireless terminal using the subscriber identification information stored in the storage circuitry succeeds.

14. The wireless communication apparatus according to claim 12, wherein the control circuitry controls the second wireless communication circuitry to transmit a payment request to a payment apparatus in order to remove the limitations on communication of the wireless terminal with the second network.

15. The wireless communication apparatus according to claim 14, wherein the control circuitry controls the second wireless communication circuitry to transmit the pairing information to the payment apparatus in order to remove the limitations on communication of the wireless terminal with the second network.

16. A server comprising:

communication circuitry configured to perform communication with a first wireless terminal that connects to a first network and performs wireless communication and a second wireless terminal that connects to a second network and performs wireless communication; and control circuitry configured to determine whether or not to remove limitations on communication of the second wireless terminal with the second network based on whether or not first pairing information received from the first wireless terminal by the communication circuitry and second pairing information received from the second wireless terminal by the communication circuitry coincide;

wherein the control circuitry performs authentication to the second network by means of extensible authentication protocol (EAP) authentication using subscriber identification information of the first wireless terminal;

a memory circuitry configured to store the information on pairing with a wireless terminal with which pairing has been established in past, wherein the control circuitry selects the information on pairing with the first wireless terminal, which has the subscriber identification information used for the EAP authentication, from the memory circuitry as a target of transmission by the second wireless communication circuitry.

17. A payment apparatus comprising:

first communication circuitry configured to perform communication with a first wireless terminal having identification information of subscribers to a first network;

second communication circuitry configured to perform communication with a server that determines whether or not to remove limitations on communication of a second wireless terminal with a second network; and control circuitry configured to perform a payment process based on a payment request received by the first communication circuitry, wherein the control circuitry controls the second communication circuitry to transmit pairing information received by the first communication circuitry to the server;

wherein the control circuitry performs authentication to the second network by means of extensible authentication protocol (EAP) authentication using subscriber identification information of the first wireless terminal;

a memory circuitry configured to store the information on pairing with a wireless terminal with which pairing has been established in past, wherein the control circuitry selects the information on pairing with the first wireless terminal, which has the subscriber identification information used for the EAP authentication, from the memory circuitry as a target of transmission by the second wireless communication circuitry.

18. A wireless communication method comprising:

performing, by first wireless communication circuitry, pairing and wireless communication with a wireless terminal that connects to a first network and performs wireless communication;

connecting, by second wireless communication circuitry, to a second network and performing wireless communication; and controlling the second wireless communication circuitry to transmit information on pairing with the wireless terminal in order to remove limitations on communication with the second network;

authenticating to the second network by means of extensible authentication protocol (EAP) authentication using subscriber identification information of the wireless terminal;

storing, by a memory circuitry, the information on pairing with a wireless terminal with which pairing has been established in past, selecting the information on pairing with the wireless terminal, which has the subscriber identification information used for the EAP authentication, from the memory circuitry as a target of transmission by the second wireless communication circuitry.

19. A wireless communication method comprising:

connecting, by first wireless communication circuitry, to a first network and performing wireless communication;

performing, by second wireless communication circuitry, pairing and wireless communication with a wireless terminal that connects to a second network and performs wireless communication; and controlling the first wireless communication circuitry to transmit information on pairing with the wireless terminal in order to remove limitations on communication of the wireless terminal with the second network;

authenticating to the second network by means of extensible authentication protocol (EAP) authentication using subscriber identification information of the wireless terminal;

storing, by a memory circuitry, the information on pairing with a wireless terminal with which pairing has been established in past, selecting the information on pairing with the wireless terminal, which has the subscriber identification information used for the EAP authentication, from the memory circuitry as a target of transmission by the second wireless communication circuitry.

20. A plurality of non-transitory computer readable storage devices having computer readable instructions that when executed by processing circuitry cause the processing circuitry to perform a method comprising:

performing, by first wireless communication circuitry, pairing and wireless communication with a wireless terminal that connects to a first network and performs wireless communication;

connecting, by second wireless communication circuitry, to a second network and performing wireless communication; and controlling the second wireless communication circuitry to transmit information on pairing with the wireless terminal in order to remove limitations on communication with the second network;

authenticating to the second network by means of extensible authentication protocol (EAP) authentication using subscriber identification information of the wireless terminal;

storing, by a memory circuitry, the information on pairing with a wireless terminal with which pairing has been established in past, selecting the information on pairing with the wireless terminal, which has the subscriber identification information used for the EAP authentication, from the memory circuitry as a target of transmission by the second wireless communication circuitry.

21. A plurality of non-transitory computer readable storage devices having computer readable instructions that when executed by processing circuitry cause the processing circuitry to perform a method comprising:

connecting, by first wireless communication circuitry, to a first network and performing wireless communication;

performing, by second wireless communication circuitry, pairing and wireless communication with a wireless terminal that connects to a second network and performs wireless communication; and controlling the first wireless communication circuitry to transmit information on pairing with the wireless terminal in order to remove limitations on communication of the wireless terminal with the second network;

authenticating to the second network by means of extensible authentication protocol (EAP) authentication using subscriber identification information of the wireless terminal;

storing, by a memory circuitry, the information on pairing with a wireless terminal with which pairing has been established in past, selecting the information on pairing with the wireless terminal, which has the subscriber identification information used for the EAP authentication, from the memory circuitry as a target of transmission by the second wireless communication circuitry.

* * * * *